United States Patent
Attar et al.

(10) Patent No.: US 6,873,831 B2
(45) Date of Patent: Mar. 29, 2005

(54) METHOD AND APPARATUS FOR TRANSMIT POWER MODULATION IN A WIRELESS COMMUNICATIONS SYSTEM

(75) Inventors: Rashid A. Attar, San Diego, CA (US); Charles E. Wheatley, III, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 157 days.

(21) Appl. No.: 10/113,283

(22) Filed: Apr. 1, 2002

(65) Prior Publication Data

US 2004/0203979 A1 Oct. 14, 2004

(51) Int. Cl.$^7$ ............................ H04B 1/04; H01Q 11/12
(52) U.S. Cl. .................. 455/127.2; 455/113; 455/101; 455/126
(58) Field of Search ..................... 455/102, 105, 455/108, 112, 113, 107, 118, 126, 127.2, 81, 82, 101, 127.1, 121

(56) References Cited

U.S. PATENT DOCUMENTS 5,305,353 A * 4/1994 Weerackody ............... 375/347

FOREIGN PATENT DOCUMENTS

| EP | 0572171 | 12/1993 | |
| EP | 0755130 | 1/1997 | |
| EP | 0755130 A2 * | 1/1997 | ........... H04B/7/005 |
| EP | 0952684 | 10/1999 | |
| EP | 1083679 | 3/2001 | |
| EP | 1083679 A1 * | 3/2001 | ........... H04B/7/06 |
| EP | 1187385 | 3/2002 | |
| WO | 9506365 | 3/1995 | |
| WO | 0219565 | 3/2002 | |
| WO | WO 02/19565 A2 * | 3/2002 | ........... H04B/7/06 |

OTHER PUBLICATIONS

Viswanath, et al. "Opportunistic Beamforming Using Dumb Antennas", pp. 1–40, Sep. 11, 2001.

* cited by examiner

Primary Examiner—Nick Corsaro
Assistant Examiner—John J Lee
(74) Attorney, Agent, or Firm—Philip Wadsworth; Sandra L. Godsey

(57) ABSTRACT

An apparatus according to one embodiment of the invention includes a transmitter. The transmitter receives an RF signal and produces at least two modulated signals based on the RF signal. Each of the modulated signals is coupled to a respective antenna. The combined radiation pattern of the antennas varies in an angular direction over time. In a system according to one embodiment of the invention, a base station including such an apparatus receives channel quality indications from mobile units and schedules data transmissions to the mobile units accordingly.

34 Claims, 22 Drawing Sheets

METHOD AND APPARATUS FOR TRANSMIT POWER MODULATION IN A WIRELESS COMMUNICATIONS SYSTEM

BACKGROUND

1. Field

The present invention relates to wireless communications.

2. Background

A modern-day communications system may be required to support a variety of applications. For example, a system may allow for voice and data communications between users over a terrestrial link. One such communications system is a code division multiple-access (CDMA) system that conforms to the "TIA/EIA/IS-95 Mobile Station-Base Station Compatibility Standard for Dual-Mode Wideband Spread Spectrum Cellular System", hereinafter referred to as the IS-95 standard. Another such system is a CDMA system that conforms to the six-part TIA/EIA/IS-2000 series, also known as 1x. Another CDMA system that supports high-data-rate communications conforms to the high rate packet data air interface specification "TIA/EIA/IS-856", also known as 1x Evolution—Data Optimized (1xEV—DO).

A network that supports wireless data communications serves data wirelessly to multiple users. In some examples, the network may serve data to one user at a time. Some users may observe a transmission channel of good quality, such that they may receive data at a high rate. Other users may observe a channel of poor quality, such that they may receive data only at a lower rate. The observed quality of a transmission channel may change over time, such that a user may receive data at different rates over corresponding different periods of time.

Two parameters that may be used to measure the performance of a data communications system are (1) the transmission delay required for transferring a data packet and (2) the average throughput of the system. Transmission delay does not generally have the same impact in data communications as it does for voice communications, but nevertheless it may be an important metric for measuring the performance of a data communications system. For example, a lower transmission delay may lead to a greater potential for using real-time applications. The average throughput may serve as a measure of the efficiency of the data transmission capability of the communications system.

It is desirable to maximize system throughput. This criterion suggests that at any one time, the user observing the best channel quality should be served. However, it is also desirable to be fair, so that a user observing a poor channel quality will still be served occasionally.

Unfortunately, serving a user at a low data rate may be detrimental to total system throughput. In a case where the network serves data to one user at a time, serving a user at a low data rate may prevent the network from serving more data to another user over the same period of time (i.e. at a higher data rate). Therefore, while it is desirable to serve all users waiting for data at least occasionally, it is also desirable to serve each user at a high data rate.

SUMMARY

A transmitter according to one embodiment of the invention includes a first gain element and a second gain element. The first gain element is configured and arranged to modulate a radio-frequency signal according to a first gain factor to produce a first output signal. The second gain element is configured and arranged to modulate the radio-frequency signal according to a second gain factor to produce a second output signal. The magnitude of both gain factors varies over time, with the magnitude of the second gain factor varying over time with respect to the magnitude of the first gain factor. Other implementations of this embodiment may include a value generator configured and arranged to generate the gain factors and/or antennas configured and arranged to radiate signals based on the first and second output signals.

A transmitter according to another embodiment of the invention also includes a first gain element and a second gain element. As above, the first gain element is configured and arranged to modulate a radio-frequency signal according to a first gain factor to produce a first output signal. In this case, the second gain element is configured and arranged to modulate the first output signal according to a second gain factor to produce a second output signal. Again, the magnitude of both gain factors varies over time, with the magnitude of the second gain factor varying over time with respect to the magnitude of the first gain factor, and other implementations of this embodiment may also include a value generator and/or antennas. Transmitters and other apparatus, methods, and systems according to further embodiments are also disclosed herein.

DETAILED DESCRIPTION

The word "exemplary" is used exclusively herein to mean "serving as an example, instance, or illustration." Any embodiment, implementation, or application described herein as "exemplary" is not necessarily to be construed as preferred or advantageous over other embodiments, implementations, or applications.

It may be desirable to increase diversity with respect to observed channel quality among receivers that communicate with a transmitter (e.g. of a network for wireless data communications). For example, it may be desirable to alter the distribution of power radiated by a transmitter over time with respect to space such that receivers which are similarly situated from a transmitter in a radial direction, but differently situated from the transmitter in an angular direction, observe different patterns of channel quality variation.

Figure 1:
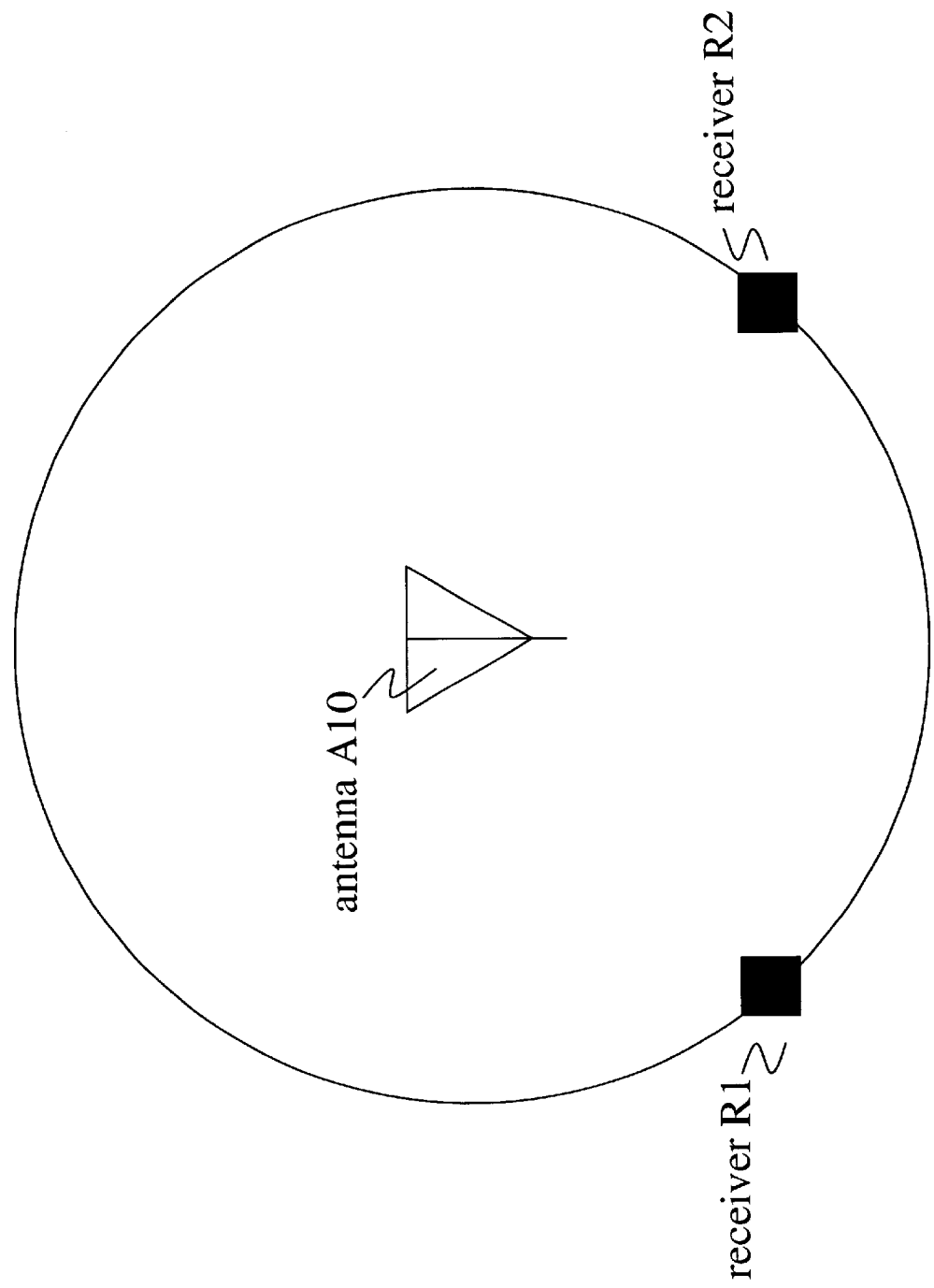
FIG. 1 shows a block diagram of two receivers R1, R2 at different locations but at the same radial distance from a transmitting antenna A10.

FIG. 1 illustrates an example of two receivers R1, R2 which are similarly situated from an omnidirectional transmitting antenna A10 in a radial direction, but differently situated from antenna A10 in an angular direction. If a possible difference in path loss is ignored for this example, each receiver observes the same channel quality from antenna A10 as the other receiver at all times. In a case where this observed channel quality is relatively poor (e.g. because the radial distance is large, or because of interference from one or more other transmitters), then a relatively long period of time may be required to serve data to either receiver via transmitting antenna A10.

Possible advantages of increased diversity are improved scheduling algorithm performance and increased system throughput. In a case as shown in FIG. 1, for example, a greater system throughput may be possible if the quality of a transmission channel from antenna A10 (e.g. the received power) is increased for receiver R1 at one time and for receiver R2 at a different time. If each receiver then sees a best channel quality that is, for example, twice as good as before, data may be served to both receivers at a higher rate (e.g. during the respective periods of high channel quality) in approximately the same time it took to serve the same amount of data to each receiver in the non-diverse example. In a system where a transmitter may transmit to fewer than all receivers (e.g. to only one receiver) at a time, rapid disposal of serving tasks in such manner may allow the transmitter to satisfy data requests from a greater number of receivers (and/or to serve a greater amount of data per unit of time) than otherwise.

Figure 2:
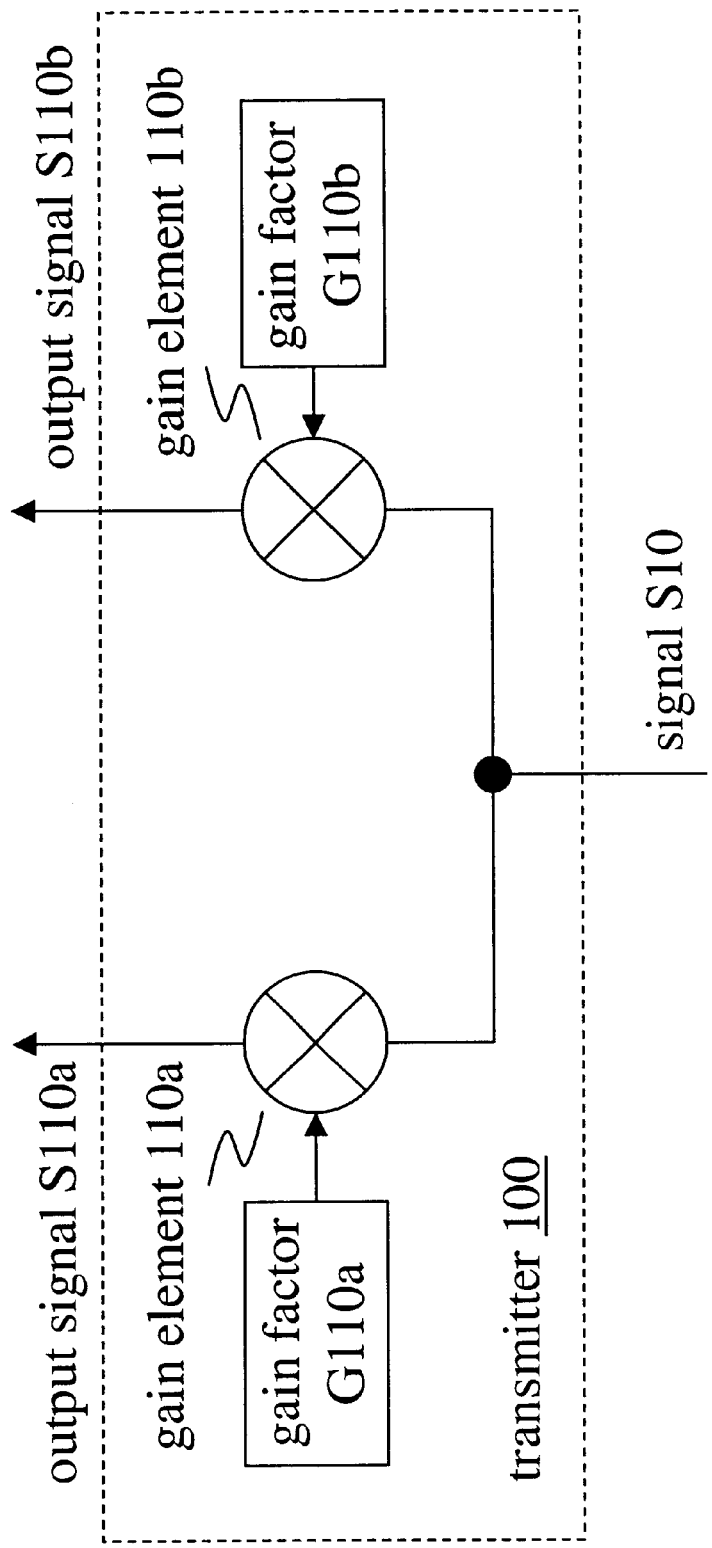
FIG. 2 is a block diagram of a transmitter 100 according to an embodiment of the invention.

FIG. 2 shows a block diagram of a transmitter 100 according to an embodiment of the invention. Gain elements 110a and 110b receive a radio-frequency (RF) signal S10. RF signal S10 may be generated within transmitter 100 and/or may be inputted or received from another device or system. In an exemplary implementation, RF signal S10 is a complex-valued modulated carrier signal having I (in-phase) and Q (quadrature) components. For example, RF signal S10 may include a carrier signal that is modulated using a PSK (phase-shift keying) modulation scheme such as BPSK (binary PSK), QPSK (quadrature PSK), 8-PSK, or OQPSK (offset QPSK). In another example, RF signal S10 may include a carrier signal that is modulated using a QAM (quadrature amplitude modulation) scheme such as 16-QAM.

Gain element 110a applies a first gain factor G110a to signal S10 to produce a first output signal S110a. The magnitude of the first gain factor varies over time. Gain element 110b applies a second gain factor G110b to the RF signal to produce a second output signal S110b. The magnitude of the second gain factor varies over time with respect to the magnitude of the first gain factor.

Each of gain elements 110 may be implemented using one or more active devices such as bipolar junction or field-effect transistors. Transmitter 100 may include additional gain elements 110 that apply gain factors G110 to the RF signal to produce additional output signals S110. In such case, the magnitudes of the additional gain factors vary over time with respect to the magnitude of gain factor G110a.

The magnitude of one or more of gain factors G110 may vary periodically. For example, one or more of these magnitudes may vary according to a sinusoidal function [e.g. $\cos(\omega t+\theta)$, where $\omega=2\pi/T$, T is a predetermined period, and $\theta$ is a predetermined phase offset value or function (e.g. of time t)]. In some exemplary applications, the longest such period is less than five seconds, and the shortest such period is greater than ten milliseconds. In one particular application to an IS-856-compliant system, T has a value of from one to two seconds. It may be desirable for the period parameter T to have a value on the order of a time constant of a forward link scheduling algorithm (as discussed below).

In some implementations, one or more of gain factors G110 are complex-valued, and the phase of such gain factors may vary over time (e.g. periodically). In one such implementation, the sum of the magnitudes of the gain factors is a constant (e.g. unity), and the phase of at least one of the gain factors varies over time.

In some applications of an implementation of transmitter 100 (e.g. during limited periods of time), one or more of gain elements G110 may also receive and apply a gain factor to a signal that is not received by another of the gain elements G110.

Figure 3:
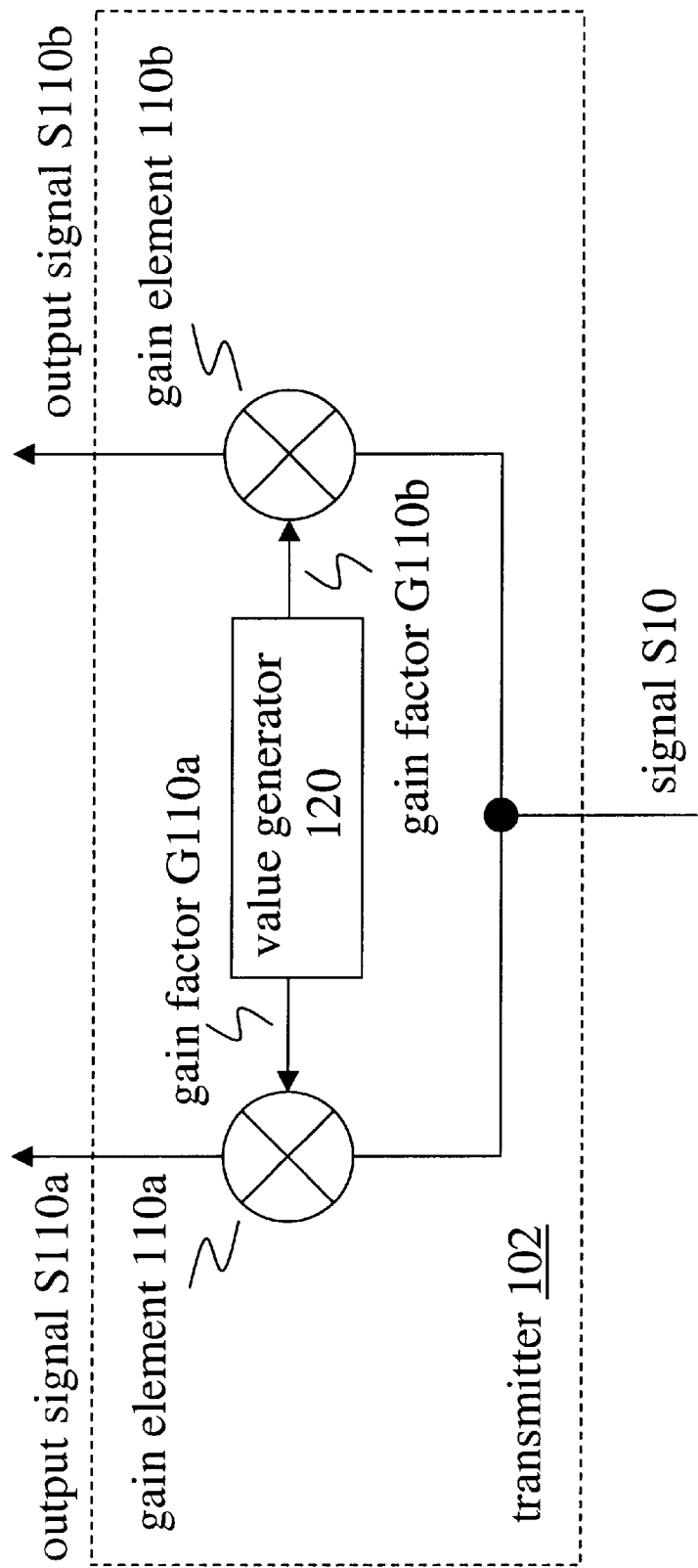
FIG. 3 is a block diagram of an implementation 102 of transmitter 100.

FIG. 3 shows a block diagram of an implementation 102 of transmitter 100. In this implementation, value generator 120 produces the gain factors G110. Value generator 120 may include an analog or digital logic circuit (e.g. an array of logic elements executing a sequence of instructions) that calculates one or more of the gain factors according to one or more predetermined functions of time. Alternatively (or additionally), value generator 120 may include one or more lookup tables that store precalculated values.

Figure 4:
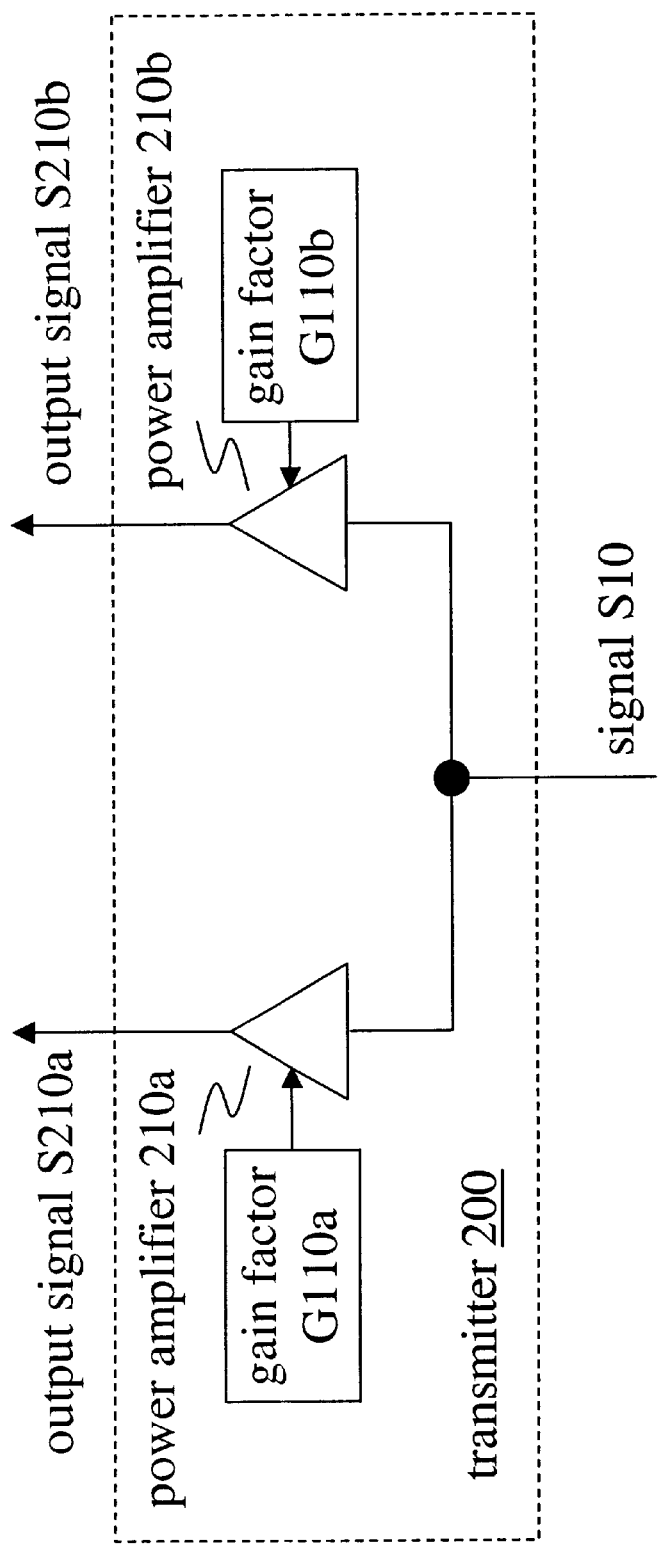
FIG. 4 is a block diagram of an implementation 200 of transmitter 100.
Figure 5:
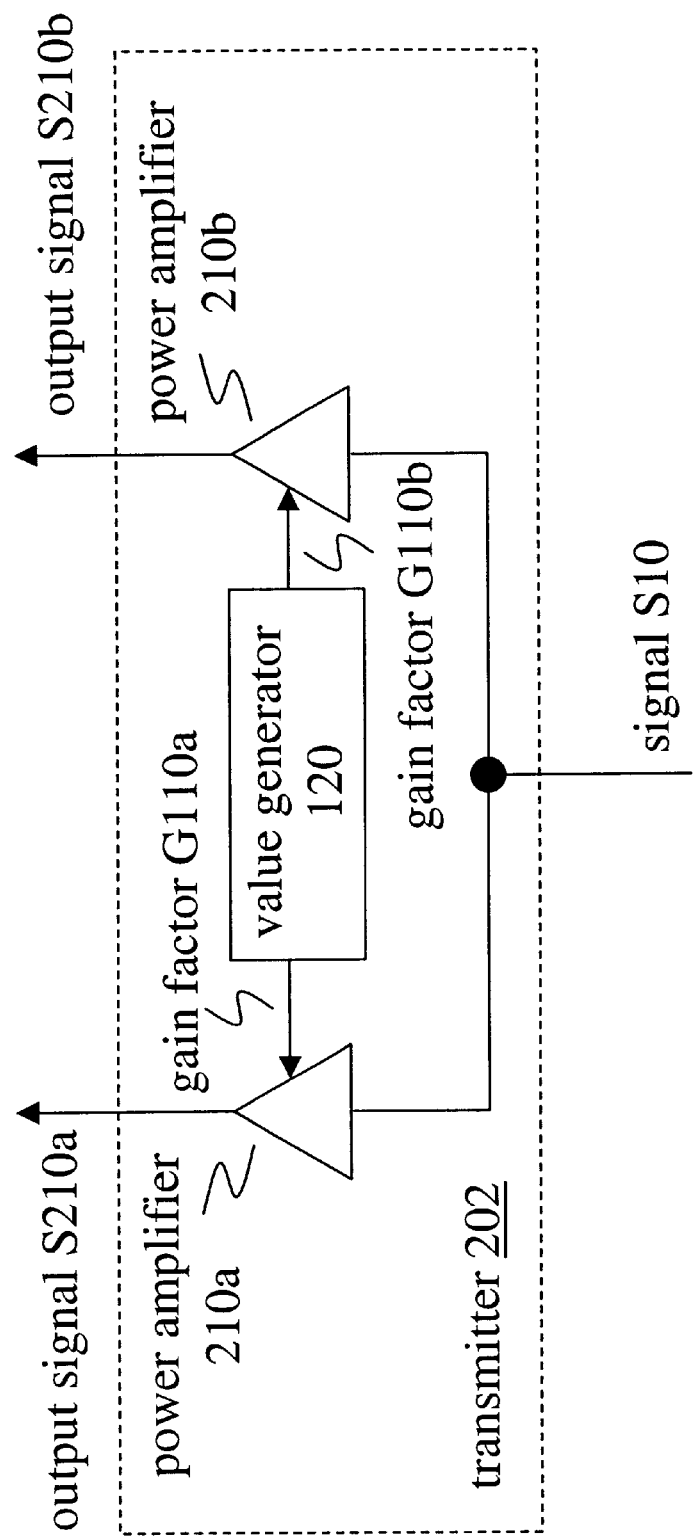
FIG. 5 is a block diagram of an implementation 202 of transmitter 100.

FIG. 4 shows a block diagram of an implementation 200 of transmitter 100. Power amplifiers 210a and 210b include gain elements 110a and 110b, respectively, as described above. In some applications, one or more of the signal paths in transmitter 200 also includes one or more other processing elements such as filters (which may be ceramic, cavity, or surface-acoustic-wave filters). FIG. 5 shows a block diagram of an implementation 202 of transmitter 100 that includes value generator 120.

Figure 6:
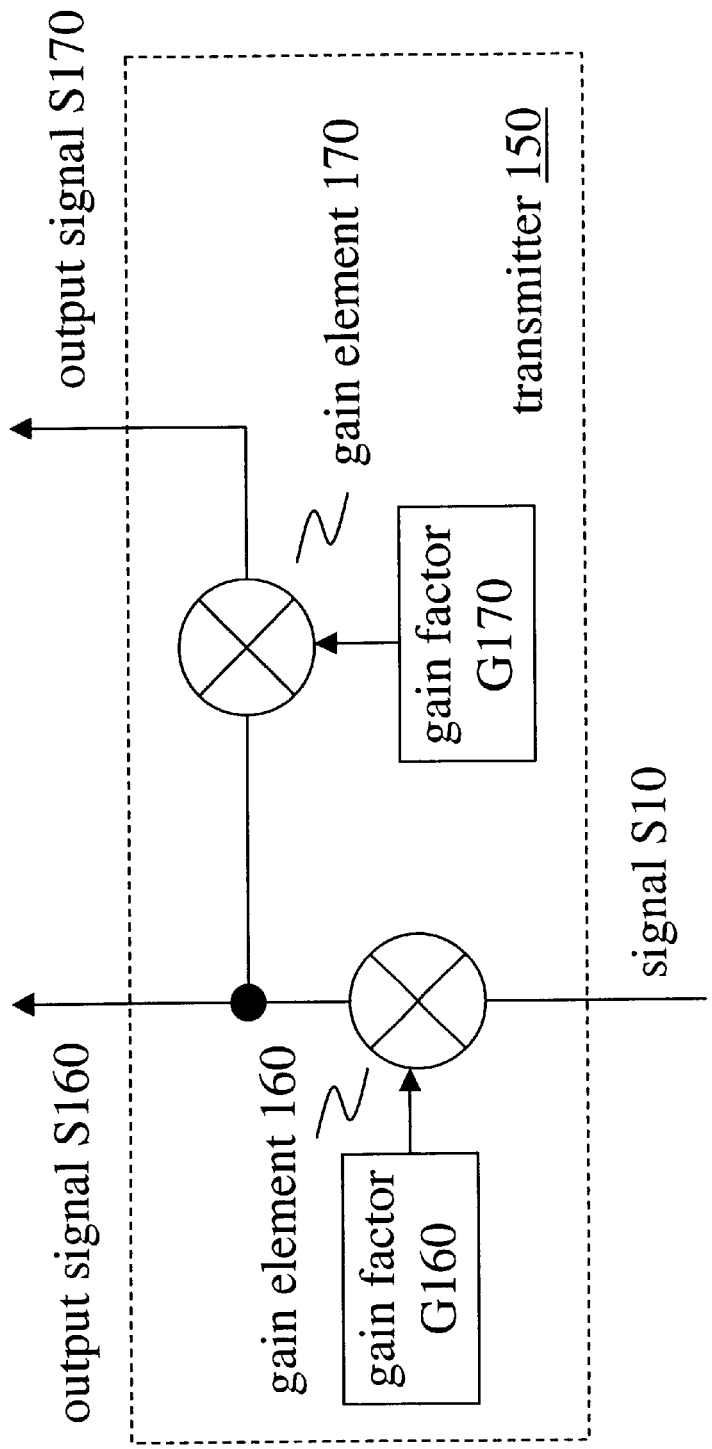
FIG. 6 is a block diagram of a transmitter 150 according to an embodiment of the invention.

FIG. 6 shows a block diagram of a transmitter 150 according to another embodiment of the invention. In this arrangement, gain element 160 receives RF signal S10 and applies a first gain factor G160 to the RF signal to produce a first output signal S160. Gain element 170 receives first output signal S160 and applies a second gain factor G170 to output signal S160 to produce a second output signal S170.

Each of gain elements 160, 170 may be implemented using one or more active devices such as bipolar junction or field-effect transistors. Transmitter 150 may include additional gain elements that apply gain factors to first output signal S160 to produce additional output signals.

As with gain factors G110 described above, the magnitude of gain factor G160 varies over time, the magnitude of gain factor G170 (and of the gain factors of the additional gain elements, if any) varies over time with respect to the magnitude of gain factor G160, and one or more of these magnitudes may vary periodically. In some implementations, one or more gain factors are complex-valued, and the phase of such gain factors may vary over time (e.g. periodically). In one such implementation, the sum of the magnitudes of the gain factors is a constant (e.g. unity), and the phase of at least one of the gain factors varies over time.

In an exemplary implementation of transmitter 150, the magnitude of gain factor G160 varies periodically as cos($\omega t-\theta$), where $\theta$ is a phase value that distinguishes one instance of transmitter 150 in a system from another. In one application, for example, the value of $\theta$ is determined by the boresite azimuth angle of the transmitter's antenna or antenna array. In such an implementation, gain factor G170 may vary as cos($\omega t+\phi$), where $\phi$ is a predetermined phase offset function of time t.

Figure 7:
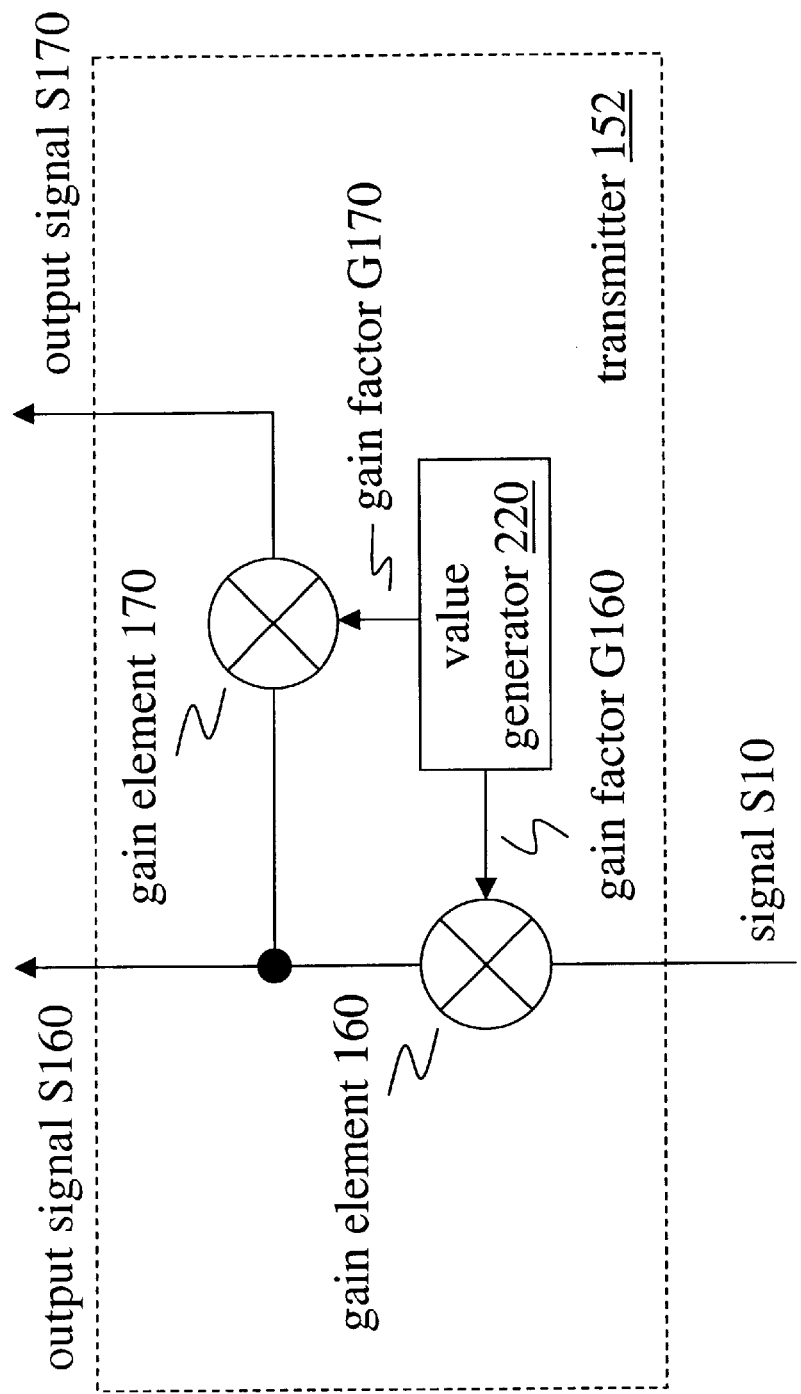
FIG. 7 is a block diagram of an implementation 152 of transmitter 150.

FIG. 7 shows a block diagram of an implementation 152 of transmitter 150 that includes a value generator 220. Value generator 220 produces the gain factors G160 and G170 and may be implemented as described above with respect to value generator 120.

Figure 8:
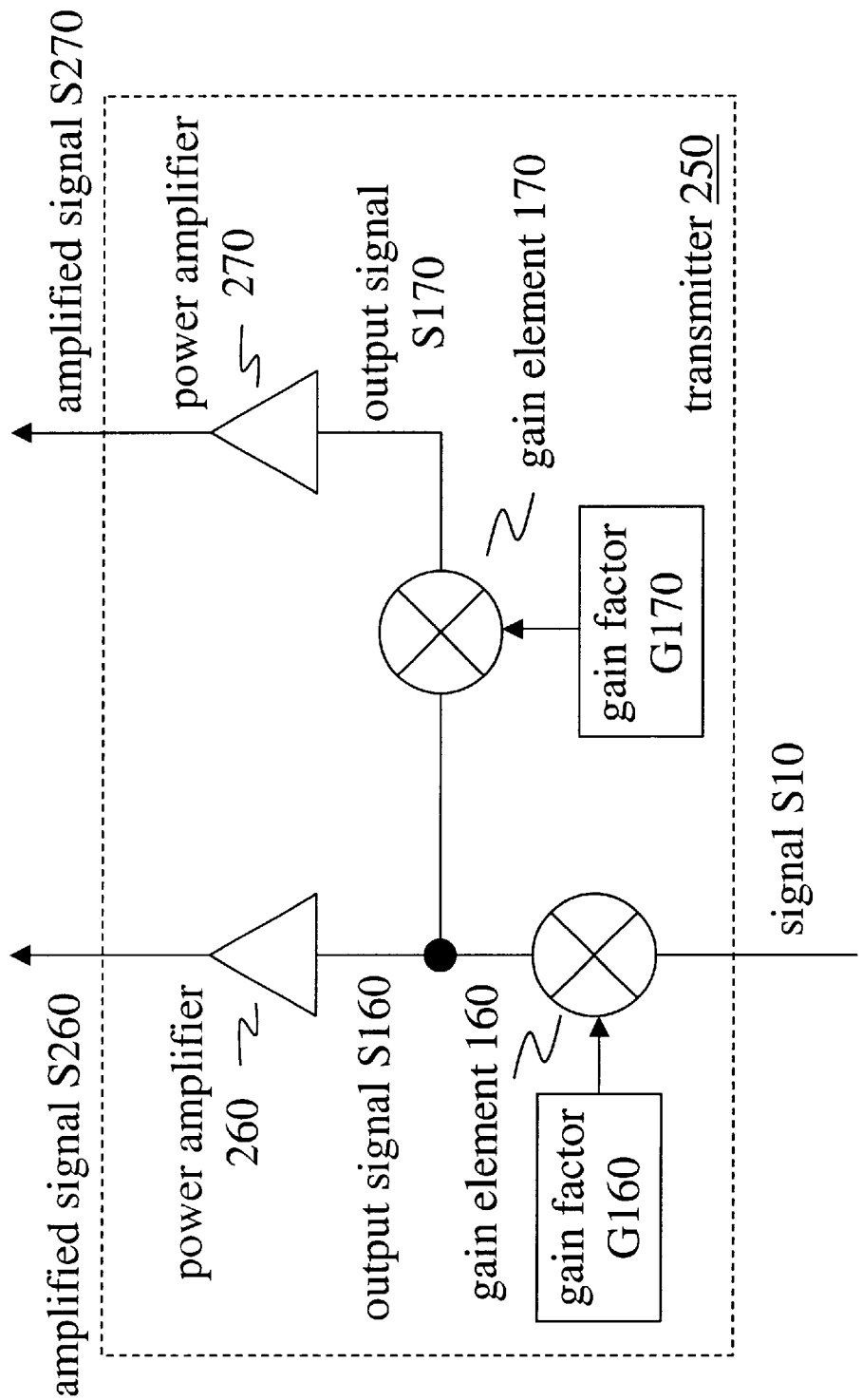
FIG. 8 is a block diagram of an implementation 250 of transmitter 150.

FIG. 8 shows a block diagram of an implementation 250 of transmitter 150. Power amplifier 260 receives output signal S160 and amplifies it to produce an amplified signal S260. Power amplifier 270 receives output signal S170 and amplifies it to produce an amplified signal S270.

Figure 9:
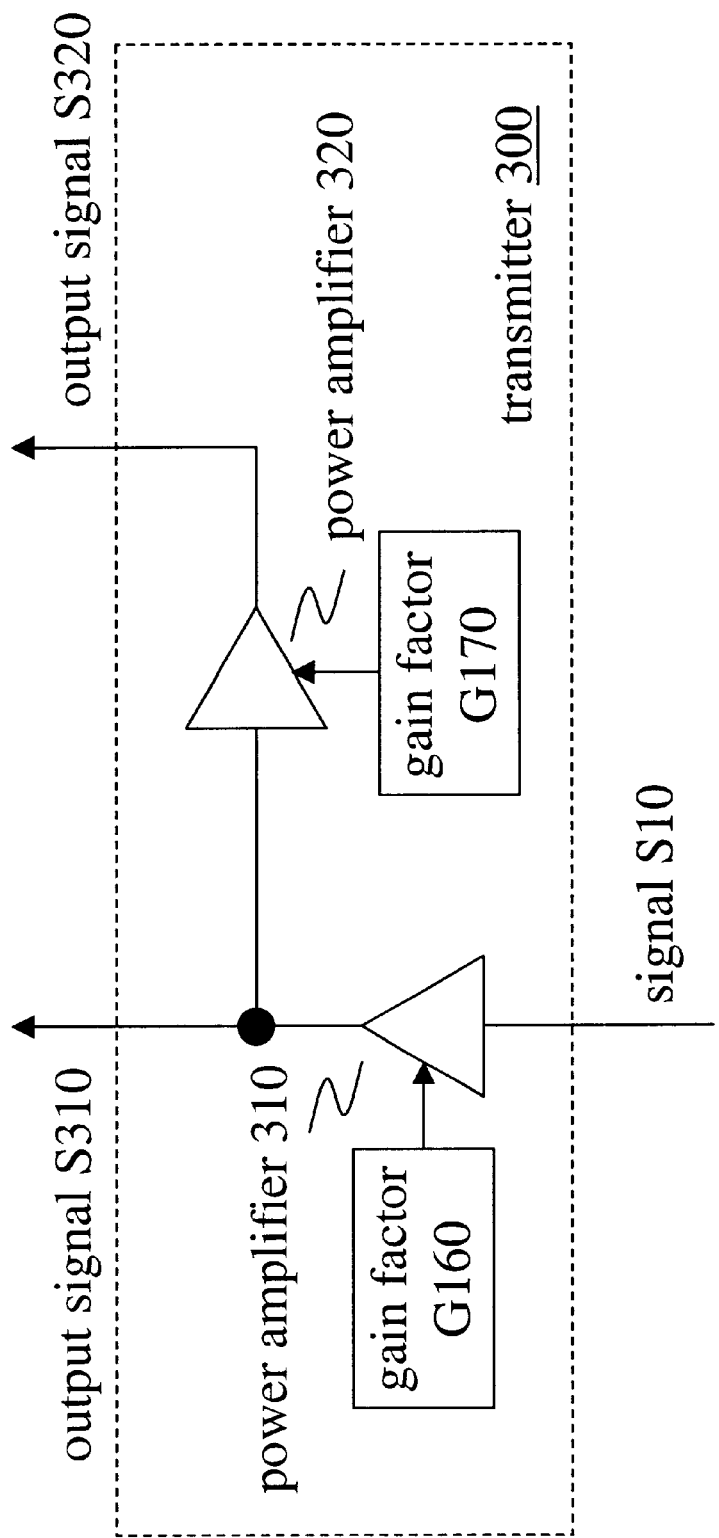
FIG. 9 is a block diagram of an implementation 300 of transmitter 150.

FIG. 9 shows a block diagram of an implementation 300 of transmitter 150. Power amplifiers 310 and 320 include gain elements 160 and 170, respectively, as described above. In some applications, one or more of the signal paths in transmitter 300 also includes one or more other processing elements such as filters (which may be ceramic, cavity, or surface-acoustic-wave filters). Another implementation of transmitter 300 includes value generator 220.

One possible advantage of an implementation of transmitter 150 is that gain element 160 and/or power amplifier 260 or 310 may be a preexisting component of a system. In such case, the transmitter may be constructed by tapping off a corresponding existing output signal to the added components (e.g. gain element 170 and/or power amplifier 270 or 320). Alternatively, gain element 160 and/or power amplifier 260 or 310 may be replaced in such a system.

In one application, a transmitter as disclosed herein is part of a base station of a cellular system for wireless communications. For example, the transmitter may be part of a base station transceiver and/or Access Point. Such a cellular system may conform to one or more of the IS-95, IS-2000, and IS-856 standards referenced above. Receivers that communicate with such a transmitter may be included within devices such as cellular, telephones, Access Terminals, portable digital assistants (PDAs), wireless modems (e.g. connected to desktop, laptop, or notebook computers), and/or wireless local loop (WLL) stations.

Alternatively, the transmitter may be part of a network access point for a wireless local-area network (LAN). Receivers that communicate with such a transmitter may be included within PDAs, wireless modems, and/or other devices. In such applications, RF signal S10 may be modulated using a CDMA or OFDM (orthogonal frequency-division multiplexing) scheme.

Figure 10:
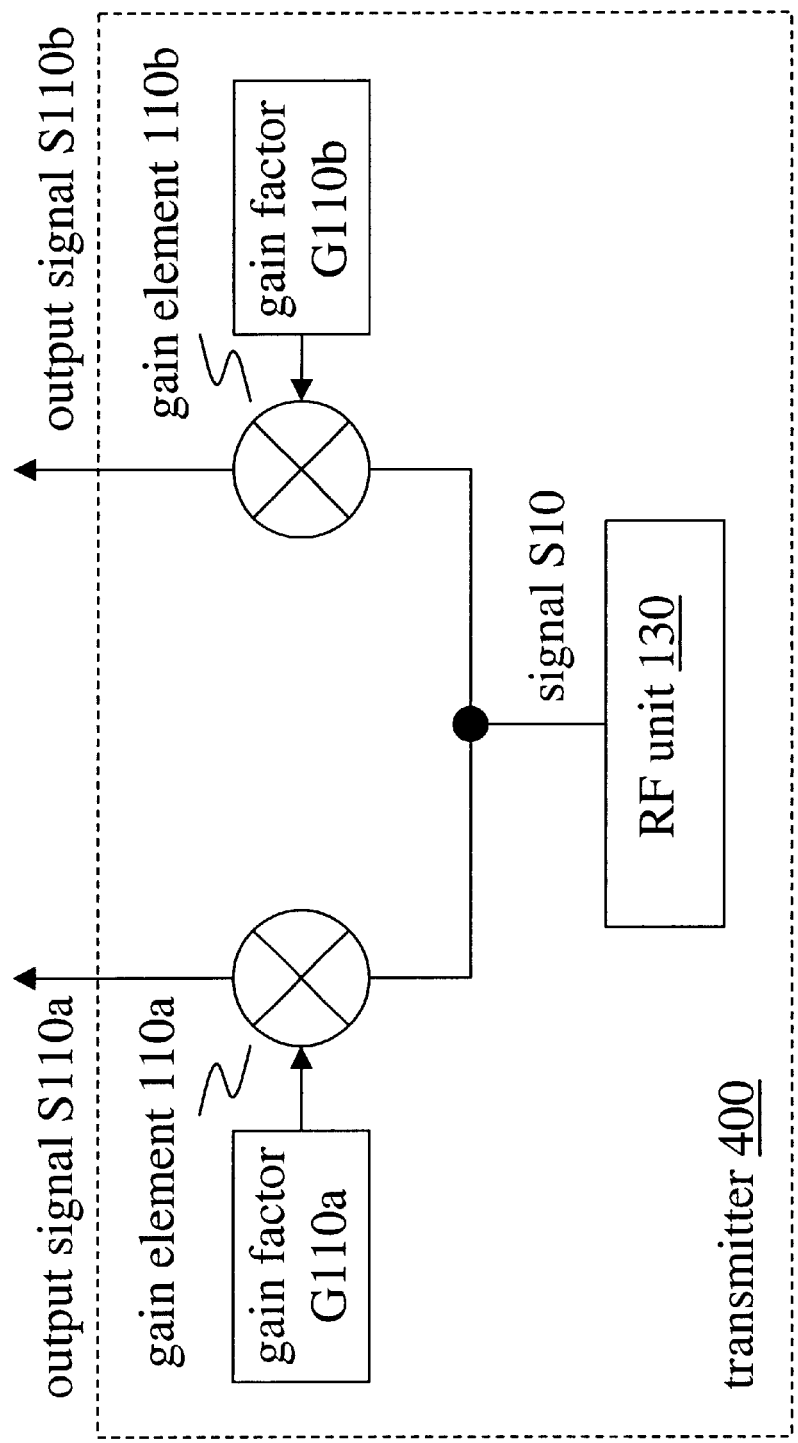
FIG. 10 is a block diagram of an implementation 400 of transmitter 100.

FIG. 10 shows a block diagram of an implementation 400 of transmitter 100. RF unit 130 produces RF signal S10. RF unit 130 may include elements that perform baseband processing operations on one or more streams of data and/or control information such as coding (e.g. vocoding, cyclic redundancy coding, and/or turbo coding), interleaving, puncturing, spreading (e.g. by one or more pseudonoise sequences), gain scaling, and/or covering (e.g. with a Walsh or other orthogonal or nearly orthogonal code) as may be appropriate for the particular application. RF unit 130 may also include elements that perform one or more RF processing operations such as carrier generation and modulation (e.g. one or more local oscillators and mixers) and filtering. Another implementation of transmitter 400 includes value generator 120.

Figure 11:
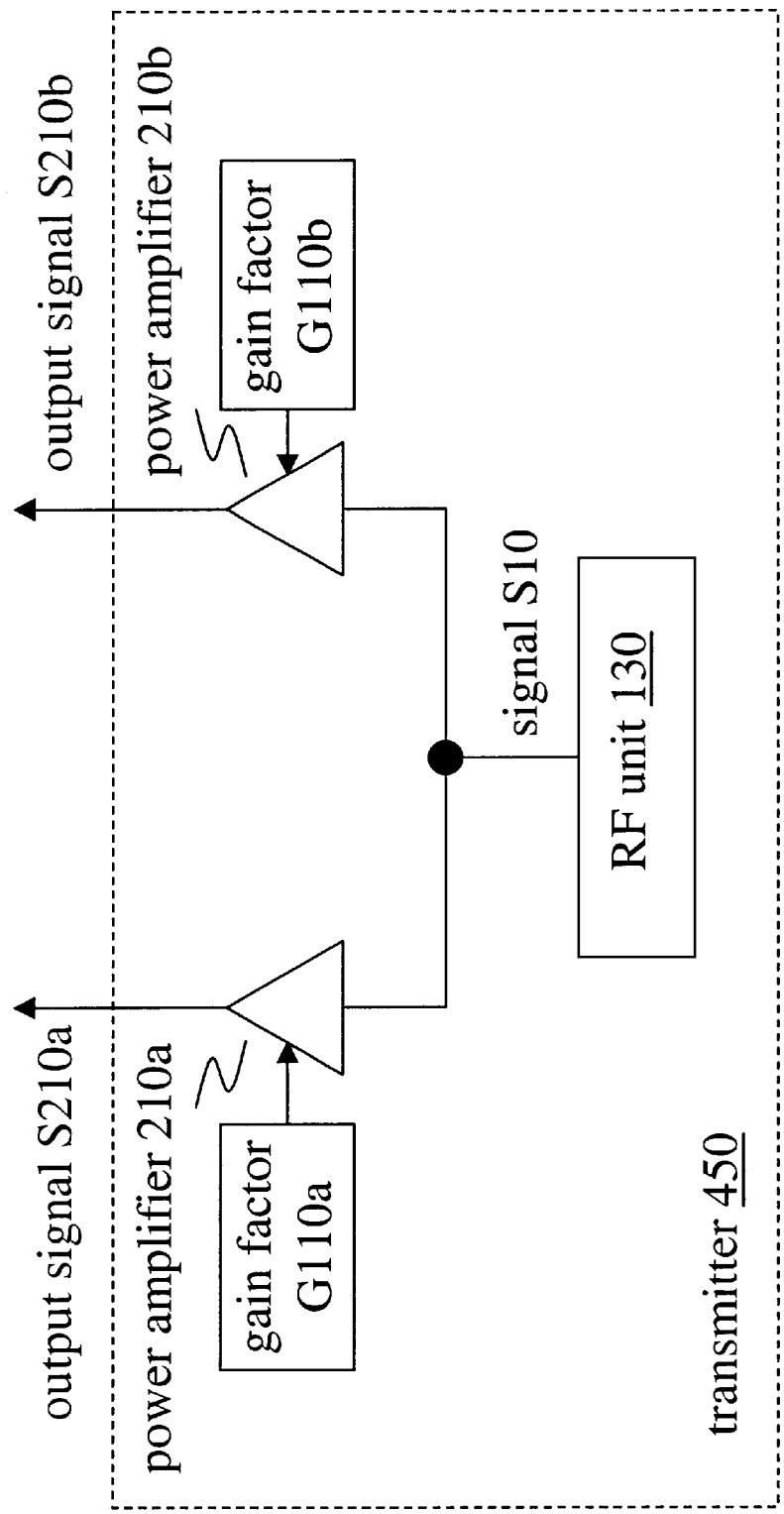
FIG. 11 is a block diagram of an implementation 450 of transmitter 100.

FIG. 11 shows a block diagram of an implementation 450 of transmitter 100 that includes RF unit 130 and power amplifiers 210 and 220. RF unit 130 may also be used to provide signal S10 to or within a transmitter as shown in FIGS. 5–9.

Figure 12:
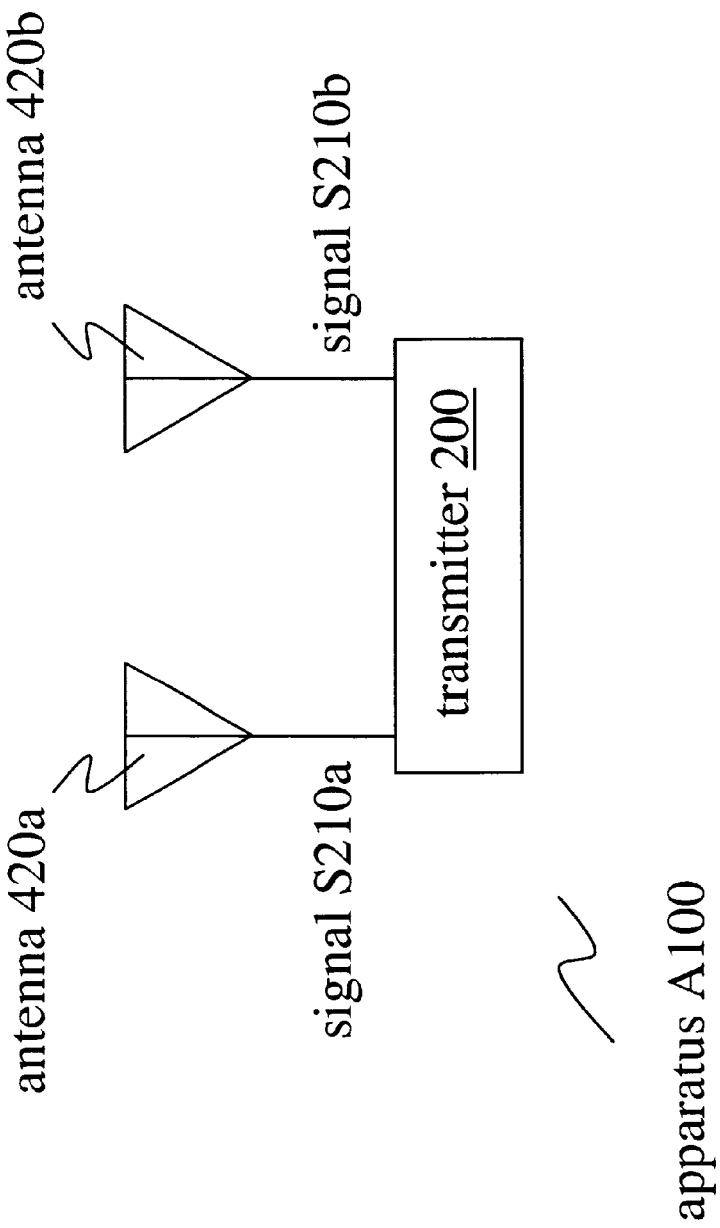
FIG. 12 is a block diagram of an apparatus A100 according to an embodiment of the invention.

FIG. 12 shows a block diagram of an apparatus A100 according to an embodiment of the invention. Apparatus A100 includes a transmitter as described above and an array of two or more antennas 420, each antenna 420 being coupled to one of the output signals of the transmitter. In this example, apparatus A100 includes transmitter 200, although other implementations of apparatus A100 may include any of the implementations of transmitters 100 or 150 as described above.

An antenna 420 may have an omnidirectional or a directional radiation pattern. In some implementations, the individual antennas 420 of an apparatus A100 are positioned such that their radiation patterns coincide or at least substantially overlap.

Antennas 420 are physically separated from one another. In one implementation of apparatus A100, antennas 420 are separated by a distance of a few wavelengths of signal S20. For a carrier signal of frequency 1.9 GHz (wavelength 15.8 cm), for example, antennas 420 in such an implementation may be separated by a distance of 30 cm (approximately two wavelengths) to 130 cm (approximately eight wavelengths).

The combined radiation pattern (i.e. the distribution of radiated power over space) of the array of antennas 420 as driven by the output signals changes over time. In at least some implementations of a method or apparatus as described herein, variations in the power of the composite radiated signal as observed at different locations and times may be modeled and/or predicted by considering that the individual signals radiated by antennas 420 interfere with one another constructively and destructively. Such interference may be considered to form a pattern of low and high field intensity (e.g. a pattern having one or more beams) whose angular distribution varies over time in accordance with the variations of the values of the gain factors.

Figure 13:
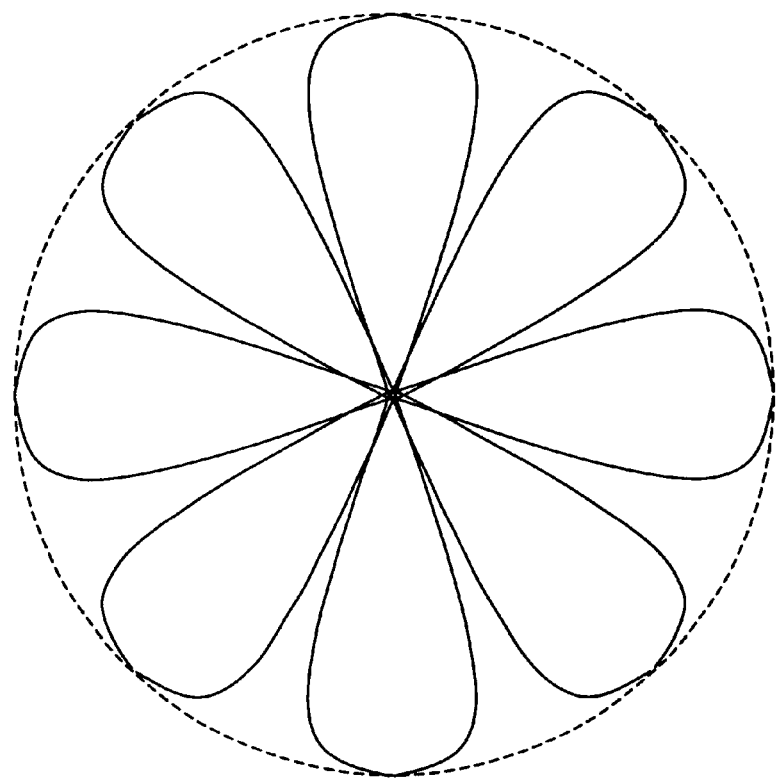
FIG. 13 is a diagram of a combined radiation pattern.

FIG. 13 shows one possible such combined radiation pattern (as viewed from above) at a particular moment of time. In this non-limiting example, antennas 420 are omnidirectional, and the distance between these antennas is considered negligible in comparison with the effective range of the composite radiated signal. The lobes in FIG. 13 indicate regions of high field intensity (or 'beams') and the areas between them indicate regions of low field intensity (or 'nulls'). As the gain factors change over time, the combined radiation pattern changes (e.g. rotates) such that the transmission channel quality as observed by a stationary receiver within range of apparatus A100 varies over time.

Figure 14:
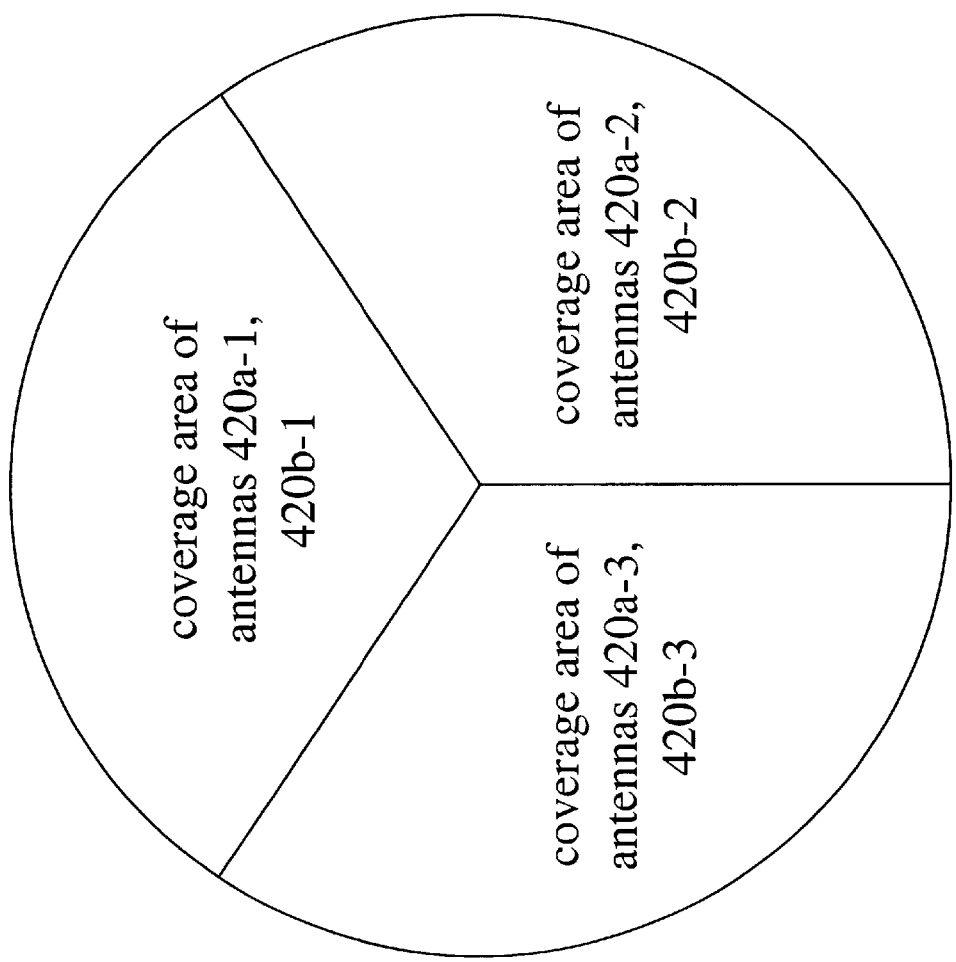
FIG. 14 is a diagram of the respective coverage areas of the antennas in an application of multiple instances of apparatus A100.

A system for wireless data communications (e.g. a cellular system) may include several transmitters in proximity. In some such systems, a transmitter may be coupled to an array of antennas that is co-located with (e.g. mounted on the same tower as), and radiating primarily in a different direction than, arrays of antennas coupled to other transmitters. In one application, several instances of apparatus A100 having directional antennas are positioned such that the coverage area of the antennas 420 of each apparatus A100 includes a different sector (e.g. as shown in FIG. 14).

The quality of a transmission channel from one transmitter in a system, as observed by a receiver, may be limited by interference from a nearby transmitter (e.g. whether co-located or in a different location such as a neighboring cell). Such a situation may arise especially when a receiver is located at or near an intersection of the radiated patterns of the transmitters' antennas (e.g. an intersection of two cells). It may be desirable to limit the degree to which one transmitter may interfere with the communications of another transmitter. For example, it may be desirable in some applications to limit the radiated power of a transmitter.

The dashed circle in FIG. 13 represents such a power limit (e.g. a radius beyond which the intensity of the radiated field may not exceed a predetermined magnitude). In one example, this limit describes the effective or desired output of apparatus A100 in a case where each gain factor has the constant value 0 dB. Alternatively, this limit describes the effective or desired output of apparatus A100 in a case where the gain factors have constant (and possibly equal) phase and a total magnitude of one.

In applications that include multiple instances of apparatus A100, an instance of apparatus A100 may vary its transmit power over time either randomly or in synchronism with respect to other instances of apparatus A100. In some such applications, each instance of apparatus A100 varies its transmit power independently of the other instances. In such a case, the combined radiation pattern as radiated by the array of antennas of each instance may be periodic (e.g. a sinusoidal pattern or a triangular pattern) or aperiodic. Within a system that includes multiple instances of apparatus A100, each instance may have a combined radiation pattern of the same or different type as the other instances.

In other applications that include multiple instances of apparatus A100, variations of the gain factors in nearby instances of apparatus A100 are synchronized. In some such applications, an output of each instance of apparatus A100 may be power-controlled such that the moment at which the maximum power output occurs for a particular instance depends upon some characteristic of the instance.

It may be desirable to coordinate the variations of the gain factors such that when one instance of apparatus A100 is increasing its transmit power with respect to a particular region of space, other nearby instances of apparatus A100 are decreasing their transmit power with respect to that region. In some cases, such an approach may be viewed as a process that dynamically moves the handoff boundary perceived by fixed receivers.

For an application as shown in FIG. 14, the variation of at least one gain factor may be based on the boresite azimuth angle of the array of antennas 420 for each instance of apparatus A100. In a particular case, the power radiated by one of the antennas 420 of each particular instance of apparatus A100 is described by the following expression:

$$P(t)=P_0(dBm)+\Delta(dB)*\cos(\omega t-\theta)$$

where $P_0$ is the nominal transmit power; $\theta$ is the azimuth angle; and $\Delta$ is the peak variation in P(t) (e.g. 1 to 4 dB). In this case, the power radiated by another one of the antennas 420 of each particular instance of apparatus A100 may be described by the following expression:

$$P_1(t)=P_{01}*\cos(\omega t-\phi)$$

where $P_{01}$, is the tapped transmit power (e.g. as inputted to gain element 170 or power amplifier 270 or 320); and $\phi$ is a phase offset function that varies over time. In a particular application, the value of $P_{01}$, is selected from the range $(20-100\%)*P_0$, and in one example, phase offset function $\phi$ has a period equal to or on the order of T. In another example, phase offset function $\phi$ has a constant value such that a constant phase difference is maintained between the power of the signal radiated by one of the antennas 420 and the power of the signal radiated by another of the antennas 420 of apparatus A100. In such a case, phase offset function $\phi$ may be substantially constant such that minor and/or temporary fluctuations in the phase difference may occur (e.g. for purposes of calibration or signaling) without changing the generally constant character of the phase difference between the powers of the radiated signals.

Figure 15:
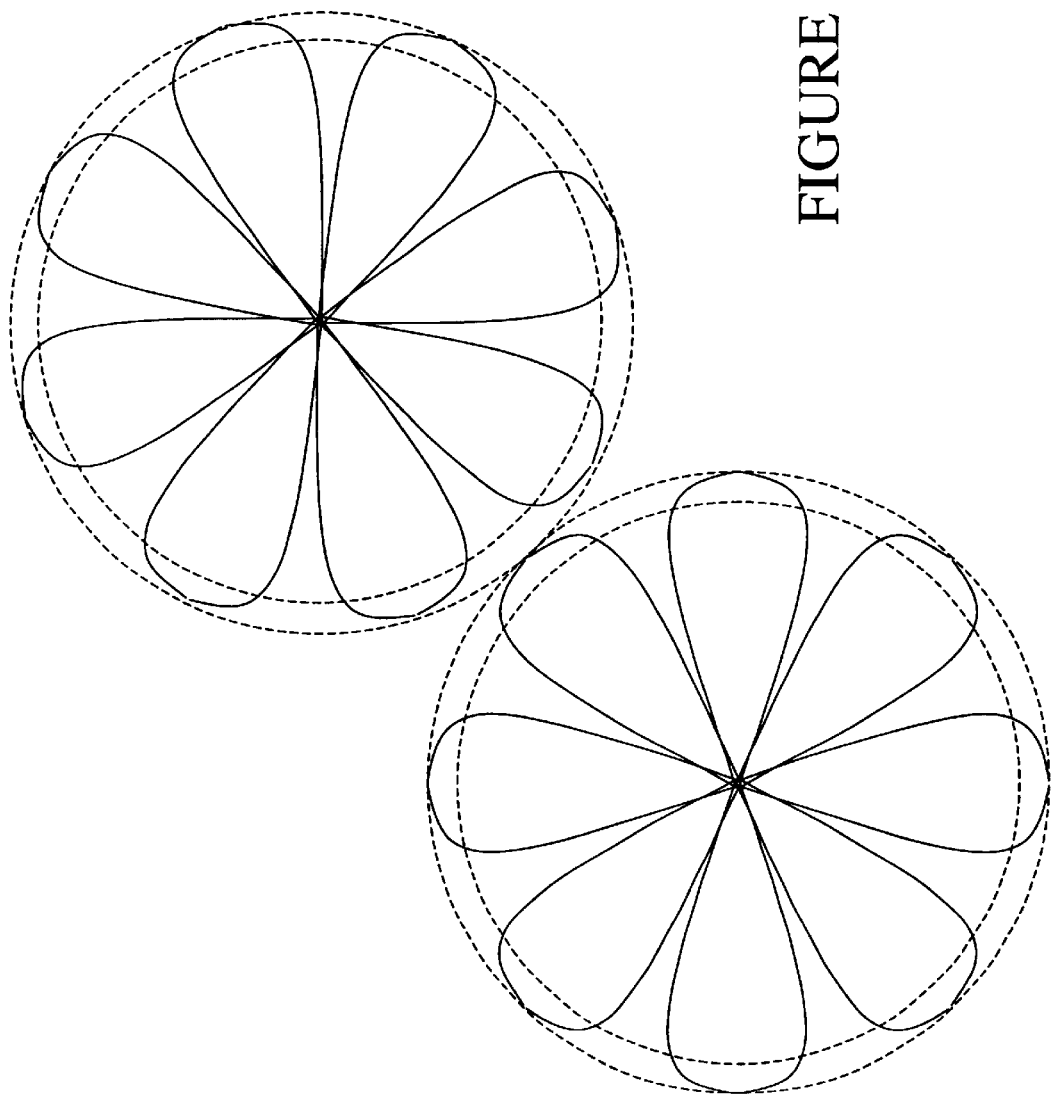
FIG. 15 is a diagram of two combined radiation patterns.

FIG. 15 shows an example of such an application in which the combined radiated power of each of two instances of apparatus A100 is greater in some directions than the average radiated power. In such applications, variations of the gain factors may be synchronized between the various (e.g. adjacent) instances of apparatus A100. For example, the radiation patterns of two instances of apparatus A100 may rotate over time at the same angular velocity, or at related or different angular velocities, and such rotations may occur in the same direction or in opposite directions. In one example, the variations of the gain factors over time are related to the boresite azimuth angle of the antenna array (e.g. as in the example described above).

In these or other such cases, the gain factors of an apparatus A100 may be scaled such that a measure of the average power radiated by the apparatus over time (e.g. according to a preselected integration function) is the same as in the constant-gain case described above. Otherwise, as shown in FIG. 15, the average power (indicated by the inner dotted circles) may be reduced as compared to that in the constant-gain case (indicated by the outer dotted circles).

As demonstrated in FIGS. 13 and 15, receivers at different locations but at the same radial distance from an apparatus A100 may observe different channel qualities at different times. In such cases, it may be desirable for apparatus A100 to serve data to respective receivers at times when channel quality is observed to be high and/or is expected to be high.

Figure 16:
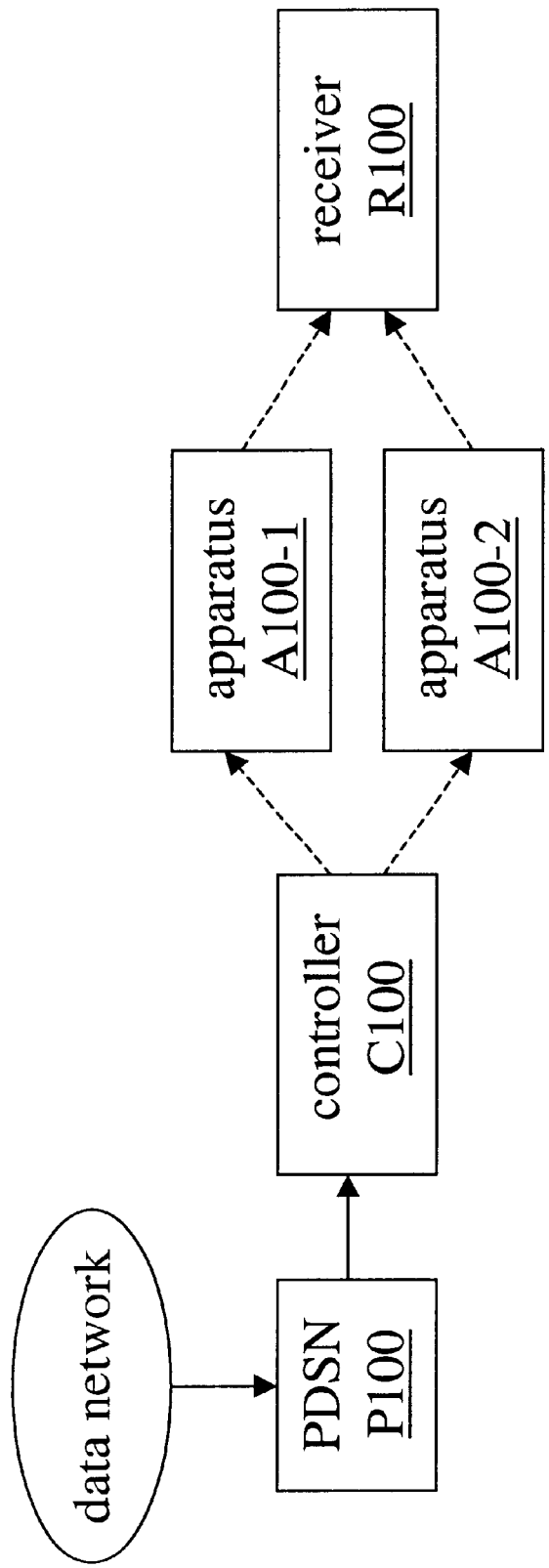
FIG. 16 is a block diagram of a system including multiple instances of apparatus A100.

Apparatus A100 may receive data directed to a receiver R100 according to a schedule or other initiating event. Such data may be received from sources such as a storage element or array of storage elements coupled to apparatus A100. Alternatively, such data may be received from a data network such as the Internet, via an interface such as a packet data serving node (PDSN P100). In a system that includes more than one instance of apparatus A100 (e.g. as shown in FIG. 16), a data controller C100 may route data traffic to one or more such instances for possible transmission to a receiver R100.

A further implementation of apparatus A100 includes a data queue to store data for possible transmission via RF unit 130 and antennas 420 to one or more receivers. Such an apparatus A100 may transmit data from the data queue in sequential order. Once transmitted, data units may be deleted from the data queue; alternatively, transmitted data units may be retained until acknowledgement is received from receiver R100.

Data transmitted by apparatus A100 may include portions of data files, images, video, messaging information, voice or sound information, web pages, or other communications. Apparatus A100 may uniquely identify a data transmission to a particular receiver R100, e.g. by using a spreading code unique to that receiver. In a particular application, apparatus A100 uses a spreading code that is a long pseudonoise (PN) code as defined in the IS-95 standard referenced above.

Data may be transmitted as packets of predetermined size. The size of a data packet may vary according to the data rate (or may be independent of the data rate) and may also depend on control information included in the packet (e.g. source and destination identifiers). In some applications, different portions of a data packet may be transmitted at two different times (e.g. during two different time slots). In these or other applications, a packet may be multiplexed across several parallel streams (e.g. where each stream is transmitted over a different frequency or frequency band and/or is covered by a different Walsh or other orthogonal or nearly orthogonal code).

In one application, apparatus A100 is stationary, the positions of the receivers R100 relative to apparatus A100 are known, and the environment is expected to be relatively constant (e.g. with respect to scattering and attenuative phenomena). Such conditions may hold, for example, in a wireless local loop (WLL) installation (especially in a rural area) or in certain wireless LANs. In such cases, apparatus A100 may serve data to different receivers over time according to the channel quality expected to be observed by each receiver (e.g. as determined by the variations of the gain factors and the locations of the receivers).

In other applications, apparatus A100 and/or one or more receivers R100 may be moving, and/or the environment may be expected to vary. In such cases, apparatus A100 may serve data to different receivers over time according to the channel qualities as observed by the receivers. In an exemplary application, mobile units that include receivers R100 transmit indicators of observed channel quality (e.g. over a wireless reverse datalink) to one or more base stations that include instances of apparatus A100.

Figure 17:
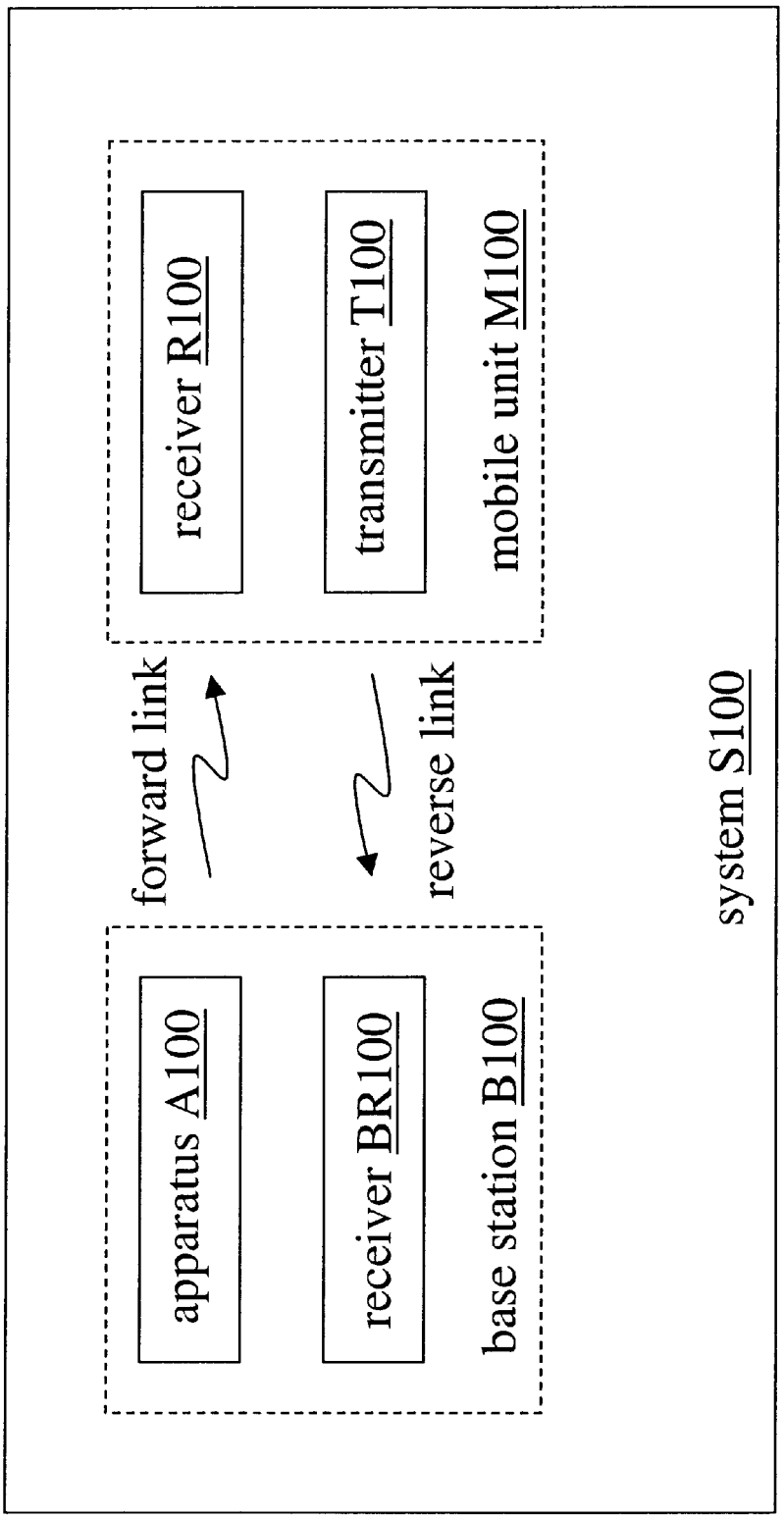
FIG. 17 is a block diagram of a system S100 according to an embodiment of the invention.

FIG. 17 shows a block diagram of a system S100 according to an embodiment of the invention. Base station B100 includes apparatus A100 and receiver BR100. Mobile unit M100 includes receiver R100 and transmitter T100. It may be desirable in a particular implementation to integrate apparatus A100 and receiver BR100 into a single transceiving unit. Likewise, it may be desirable in a particular implementation to integrate receiver R100 and transmitter T100 into a single transceiving unit.

The term 'forward link' refers to a transmission from a base station to one or more mobile units, and the term 'reverse link' refers to a transmission from a mobile unit to one or more base stations. In some systems (e.g. IS-95—compliant systems), forward link transmissions occur over a frequency band or set of bands, and reverse link transmissions occur over a different frequency band or set of bands.

In addition to the examples described above, base station B100 may receive data directed to mobile unit M100 in response to a request transmitted by the mobile unit (e.g. a request generated by a web browser or other application executing on mobile unit M100, possibly received by base station B100 and/or by another instance of base station B100 and forwarded to a data network). Alternatively, base station B100 may receive data directed to mobile unit M100 from another instance of mobile unit M100.

In one implementation of system S100, mobile station M100 observes the quality of a transmission channel from at least one instance of base station B100 and transmits a corresponding channel quality indication to at least one of the instances of base station B100. Depending upon the particular application, mobile unit M100 may observe the channel quality constantly, periodically, according to a schedule, upon a predetermined event (e.g. user activity), and/or in response to a transmission (e.g. a paging message) received from one or more instances of base station B100.

RF signal S10 may include a pilot signal. In such a case, a mobile unit may transmit a channel quality indication based on the observed strength of the received pilot signal. In one application, the pilot data comprises a sequence of all zeros (or all ones). The pilot signal may be coded (e.g. spread with a predetermined pseudonoise sequence) and/or covered (e.g. with a Walsh or other orthogonal or nearly orthogonal code). One or more such spreading or covering codes may serve to identify or otherwise distinguish one pilot signal (e.g. transmitted by a particular instance of apparatus A100) from another. It may be desirable for apparatus A100 to transmit a pilot signal even when no data is immediately available for transmission.

Figure 18:
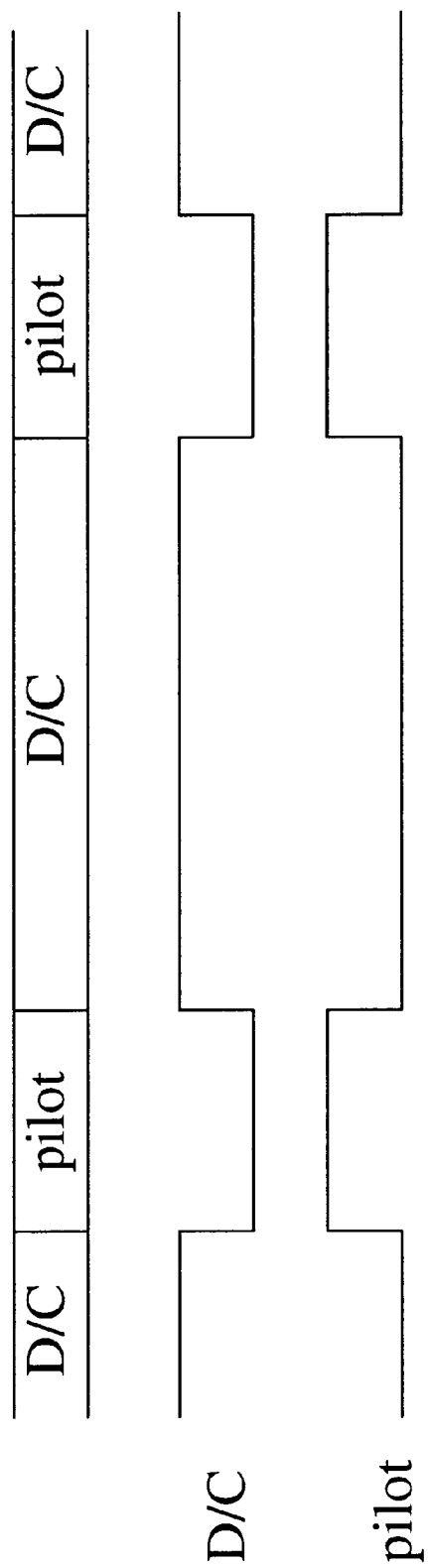
FIG. 18 is an illustration of a forward link signal.

A pilot signal may be transmitted as a continuous signal, or it may be multiplexed in time with data and/or control signals. For example, RF signal S10 may include pilot signal bursts that are multiplexed in time with data and/or control signal bursts (D/C) as shown in FIG. 18. Information in data or control signals may be encoded such that only a specified receiver or set of receivers R100 may decode it; alternatively, such information may be encoded such that all receivers in the system may decode it.

Transmissions on RF signal S10 may be divided in time into slots of a fixed duration. In one example, each slot has a duration of 1.667 milliseconds. In such applications, one or more pilot signal bursts may occur at predetermined locations within such a slot. In one example, each time slot includes two pilot bursts, each sixty-four chips in duration, that occur at the end of the first and third quarters of the time slot.

In one implementation of apparatus A100 for use in a system including a pilot signal, total transmit power is controlled. In another implementation, the pilot signal and the data signal are power-controlled. In another implementation, only the data signal is power-controlled.

Figure 19:
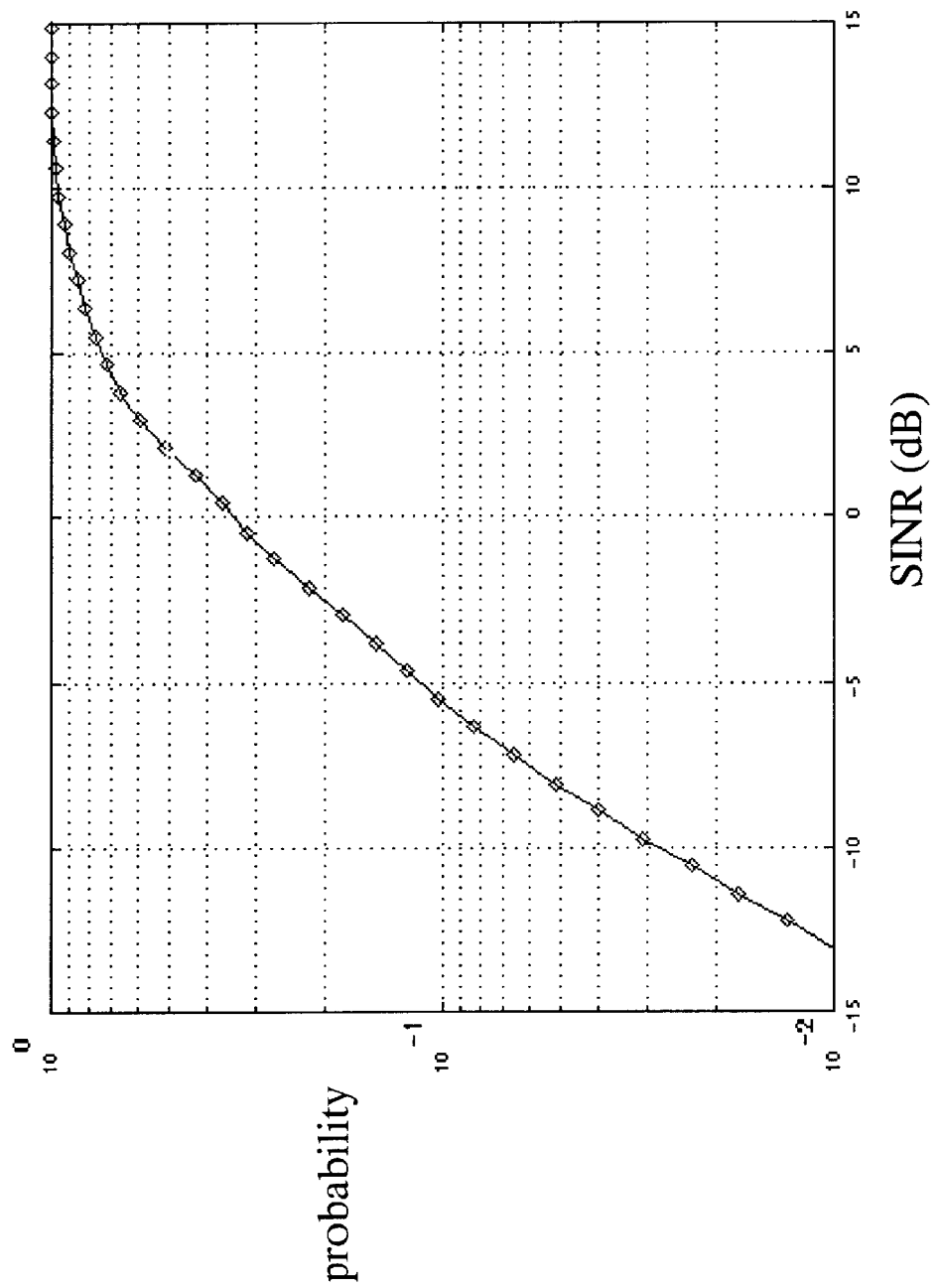
FIG. 19 is a diagram of the cumulative distribution function (CDF) of the SINR distribution in a typical hexagonal cellular layout.

In one example, observing channel quality includes measuring a signal-to-interference-and-noise ratio (SINR) for each observed channel (other channel quality observations may include bit- or packet-error-rate measurements). The SINR observed by a receiver is a function of the path loss, which for terrestrial cellular systems increases as $r^3$ to $r^5$, where r is the distance to the radiating source. The path loss may also be subject to random variations due to man-made or natural obstructions within the path of the radio wave. These random variations are typically modeled as a lognormal shadowing random process with a standard deviation of 8 dB. FIG. 19 shows one example of a SINR distribution that may be observed in a system including transmitters arranged in a typical hexagonal cellular layout with omnidirectional antennas, an $r^4$ propagation law, and a shadowing process with 8 dB standard deviation. Because of the random nature of the path loss, the signal with the largest SINR value may be transmitted by a base station located farther from the mobile unit than another base station.

Data rate may be related to observed SINR according to the following expression:

$$R_b = W \frac{SINR}{(E_b/I_o)}, \quad (1)$$

where $R_b$ represents the information rate on a particular channel, W is the total bandwidth occupied by the signal, and $E_b/I_o$ is the energy per bit over interference density that is required to achieve a given level of performance. For example, if the radiated signal occupies a bandwidth W of 1.2288 MHz, and reliable communication requires an average $E_b/I_o$ equal to 3 dB, then a receiver that observes a SINR of 3 dB over a channel may receive data over that channel at a rate as high as 1.2288 Mbps. On the other hand, given these parameter values, if the receiver is subject to substantial interference (e.g. from adjacent transmitters) and can only observe a SINR of −7 dB, reliable communication might not be supported at a rate greater than 122.88 Kbps.

In one application, a SINR measurement is obtained by despreading the received pilot signal. (Once data transmission to mobile unit M100 begins, further SINR measurements may be obtained from the data signal.) A channel quality indication may be based on a present channel quality observation (e.g. a SINR measurement) as well as one or more past channel quality observations. A channel quality indication may become inaccurate if the channel condition changes before the indication is transmitted, and it may be desirable to transmit the channel quality indication(s) in close temporal proximity to the corresponding channel quality observation(s) (e.g. within one time slot).

In a system including more than one instance of base station B100, mobile unit M100 may select one or more instances of base station B100 based on parameters such as best observed channel quality. In an exemplary implementation of system S100, mobile unit M100 sends a channel quality indication to at least one selected instance of base station B100. For example, mobile unit M100 may send a channel quality indication to the instance of base station B100 which corresponds to the best observed channel quality. Depending upon the particular application, mobile unit M100 may transmit the channel quality indication(s) constantly; periodically; according to a schedule; and/or in response to a predetermined event such as measurement of a high observed channel quality (e.g. in comparison to a predetermined threshold value), or receipt of a transmission from one or more instances of base station B100.

Mobile unit M100 may transmit a channel quality indication using a PSK (phase-shift keying) modulation scheme such as BPSK (binary PSK), QPSK (quadrature PSK), or OQPSK (offset QPSK). Mobile unit M100 may also transmit a pilot signal. In one implementation, the same reverse link channel carries the pilot signal and the channel quality indication (e.g. during different time slots or different portions of time slots). Mobile unit M100 may also transmit other control information to base station B100 (such as an excess SINR indication that base station B100 may apply to reduce its transmit power).

In some applications, both the forward link and reverse link data transmissions occur over time slots. In such a case, mobile unit M100 may send a channel quality indication in every time slot. The time slots may have the same duration in both the forward and reverse link cases (e.g. 1.667 milliseconds). Alternatively, data transmission on the reverse link may occur at a lower data rate, such that a longer time base unit may be used on the reverse link to improve efficiency.

In one application, mobile unit M100 transmits a SINR index that represents a quantized value of the SINR measurement. Using more bits to represent the SINR index may allow a finer quantization of the SINR measurement at the possible expense of more complexity and/or more transmission overhead. The index mapping may be linear or predistorted. For a linear mapping, each increment in the SINR index represents a corresponding increase of a constant amount (e.g. 2.0 dB) in the SINR measurement. For a predistorted mapping, each increment in the SINR index may represent a different increase in the SINR measurement. For example, a predistorted mapping may be used to quantize the SINR measurement to match the cumulative distribution function (CDF) curve of the SINR distribution as shown in FIG. 19.

In another application, mobile unit M100 transmits the channel quality indication as a data rate request. For example, mobile unit M100 may transmit a request for transmission at the highest data rate that the measured SINR can reliably support. The data rate request may take different forms. In one embodiment, the request indicates the requested data rate. In another embodiment, the request is a number or other symbol or set of symbols that indicates the requested data rate, such as an index into a preestablished table of data rates. In yet another embodiment, the request indicates the quality of the forward link (such as a SINR index), which a receiving base station B100 assesses to determine the appropriate data rate.

In a system that includes more than one instance of base station B100, it may be desirable for mobile unit M100 to transmit a channel quality indication such that only a selected one or more instances of base station B100 may receive the request. In one such embodiment, each instance of base station B100 is assigned a code (e.g. a Walsh or other orthogonal or nearly orthogonal code) that is unique at least among the instances of base station B100 in communication with mobile unit M100, and mobile unit M100 covers the channel quality indication with the code corresponding to the selected instance of base station B100. For example, the symbols of the channel quality indication may be exclusive-ORed (XOR) with the unique code, such that only the instance of base station B100 that performs the identical XOR operation (i.e. using the correct code) may decode the transmission. In a particular example, the unique code is a Walsh code 128 (one hundred twenty-eight) chips in length.

In one implementation of system S100, mobile unit M100 calculates the maximum data rate that may be reliably supported in light of the observed channel quality, quantizes this rate to an available (e.g. indexed) data rate, and transmits an indication of this available data rate as a channel quality indication. In one such application, the minimum available data rate is 38.4 Kbps and the maximum available data rate is 2.4576 Mbps. The minimum available data rate may be selected based on such factors as the worst-case SINR measurement in the system, the processing gain of the system, the design of any error correcting codes, and the desired level of performance.

Supporting a greater number of available data rates may require more bits to identify the requested data rate but may also allow for more efficient use of the forward link (e.g. due to a smaller quantization error between the calculated maximum data rate and the closest available data rate). An increment between the available data rates may represent a compromise among several factors such as the accuracy of the channel quality measurement that may be achieved by mobile unit M100, the losses (or inefficiencies) that may result from the quantization of the data rates, and the number of bits needed to convey the data rate request from mobile unit M100 to base station B100. In one application, a linear increment of 3 dB separates adjacent available data rates. In other applications, a nonlinear mapping may be used.

Likewise, a compromise may be made between the number of available data rates and the number of bits needed to convey the channel quality indication. In one application, the number of available data rates is seven, and a 3-bit rate index is used in the channel quality indication to identify the requested one among these data rates.

In some implementations, the channel quality indication may be transmitted redundantly. For example, it may be desirable to ensure a low probability of error in the transmission of such information. In such cases, mobile unit M100 may apply an error correcting code to the channel quality indication before transmission. In one such embodiment, mobile unit M100 includes a rate (8,4) CRC (cyclic redundancy checksum) block encoder that encodes a 3-bit data rate message into an 8-bit code word, and base station B100 includes an appropriate decoder. As described above, it may be desirable in some applications to cover the code word before transmission with a unique code corresponding to one or more selected instances of base station B100. (In one application, the code word includes an excess SINR indication.)

In another implementation, a channel quality indication is conveyed to base station B100 using an absolute reference and a relative reference. In one such application, the absolute reference is transmitted periodically. The absolute reference identifies the observed channel quality indication to a predetermined degree of accuracy. Between transmissions of the absolute references, mobile unit M100 transmits (e.g. at each time slot) a relative reference that indicates whether the data rate currently requested is higher, lower, or the same as the data rate previously requested. Periodic transmission of an absolute reference may allow the requested data rate to be set to a known state from time to time and may reduce or prevent accumulation of error (e.g. due to faulty receptions of relative references). In an application where fewer bits are used to transmit the relative references, an overall reduction in reverse link transmission overhead may be realized. Other protocols to transmit a channel quality indication are possible and are included within the scope of the present invention.

In one implementation, mobile unit M100 transmits a channel quality indication within the first half of each time slot. Such an arrangement may allow a receiving base station to use the remaining half of the time slot to decode and/or decover the channel quality indication (if necessary) and to configure apparatus A100 for data transmission at the next successive time slot if appropriate (e.g. if data is available and if transmission to another receiver is not selected). If the next successive time slot is not available, base station B100 may continue to monitor the reverse link channel for new channel quality indications until a time slot is available.

In one application, mobile unit M100 transmits a channel quality indication at each time slot during periods when mobile unit M100 is receiving data transmissions as described above. In such a case, mobile unit M100 may or may not transmit a pilot signal during the remainder of the time slot. During periods when mobile unit M100 is not receiving such data transmissions, it may be desirable for mobile unit M100 to transmit a pilot signal on the reverse link channel, possibly during the entire slot.

In certain cases as described above, mobile unit M100 transmits a channel quality indication to base station B100 that includes a requested data rate, and base station B100 transmits data to mobile unit M100 at the requested data rate. In such cases, it may be unnecessary for base station B100 to explicitly identify to mobile unit M100 the rate of the data transmission. In other applications, base station B100 may transmit at a rate that is different than the requested data rate, based on such factors as the resources available to base station B100 (e.g. queue size, amount of data available to transmit to mobile unit M100, available transmit power) and previously received channel quality indications. In such cases, the data rate being used may be communicated to mobile unit M100 over another forward link channel or may be detected by mobile unit M100 from the data transmission itself.

In an exemplary implementation, base station B100 transmits a paging signal to mobile unit M100 upon receiving data directed to mobile unit M100. The paging signal may be encoded (e.g. spread by a particular pseudonoise sequence) or otherwise formatted such that only the particular mobile unit M100 may interpret it. In a system that includes more than one instance of base station B100, more than one such instance may receive data directed to mobile unit M100 and transmit a paging signal to mobile unit M100.

In some applications, base station B100 may receive data directed to more than one instance of mobile unit M100, may transmit paging signals to more than one such instance of mobile unit M100, and/or may receive channel quality indications from more than one instance of mobile unit M100. In one such case, base station B100 may select one or more different instances of mobile unit M100 for data transmission from one time slot to the next.

After transmitting a paging signal, a base station B100 according to such an implementation may monitor the reverse link channel for a channel quality indication from mobile unit M100. Upon receipt of a channel quality indication, base station B100 may transmit data to mobile unit M100 (e.g. beginning with the next available time slot). If no channel quality indication is detected on the reverse link channel, base station B100 may retransmit the paging signal a predetermined number of times. Alternatively, base station B100 may receive a command (e.g. from controller C100) to terminate the process (e.g. because another instance of base station B100 is in communication with mobile unit M100).

In one application, mobile unit M100 may request data transmissions from different instances of base station B100 at each time slot (e.g. as relative channel qualities change). In such an application, it may be desirable to coordinate the transmission of data to mobile unit M100 among the different instances of base station B100.

In one such implementation of system S100, an instance of base station B100 informs controller C100 of a data transmission to mobile unit M100. Controller C100 then sends an update message to other instances of base stations B100 that identifies the data transmitted. For example, controller C100 may send such a message to all such instances or only to those instances assigned to communicate with mobile unit M100 (e.g. instances of base station B100 that have data directed to mobile unit M100). If mobile unit M100 then requests data transmission from a different instance of base station B100 (e.g. in a channel quality indication subsequently transmitted), the new instance may send data units that have not yet been transmitted to mobile unit M100.

In one application, the new instance of base station B100 transmits data in accordance with the most recent update message from controller C100. Alternatively, the new instance may select data units to transmit using predictive schemes based on metrics such as the average transmission rate and prior update messages.

It may be desirable for controller C100 and/or base station B100 to be able to distinguish data units (e.g. packets) from one another. In one application, data units are identified using unique sequence numbers. In such a case, mobile unit M100 may detect that a received sequence of data units is incomplete and may identify and request retransmission of the missing data units.

In some applications, it may be desirable to limit the degree of variation in the combined radiated signal of an apparatus A100. In an implementation of system S100, for example, a number of instances of base station B100 (an 'active set') may be assigned to communicate with mobile unit M100, based at least in part on the channel quality as indicated by mobile unit M100. If the strength of a received pilot signal is above a predetermined add threshold or below a predetermined drop threshold, mobile unit M100 may report this observation, and subsequent control signals may direct mobile unit M100 to add or delete those instances of base station B100 to or from its active set, respectively. In such implementations, it may be desirable to avoid inducing a high turnover rate in the active set of mobile unit M100.

In another example, communications between mobile unit M100 and one or more instances of base station B100 may include feedback information that supports one or more control loops (in a particular example, RF signal S10 includes such control information). In one such loop, base station B100 transmits information to control the transmit power of mobile unit M100. If the channel quality observed by mobile unit M100 varies so greatly that control information transmitted by base station B100 is not received, then a control loop may not function as desired.

In another example, mobile unit M100 may receive a paging signal from base station B100 as described above. If the channel quality observed by mobile unit M100 varies too greatly, then mobile unit M100 may not receive the paging signal.

Figure 20:
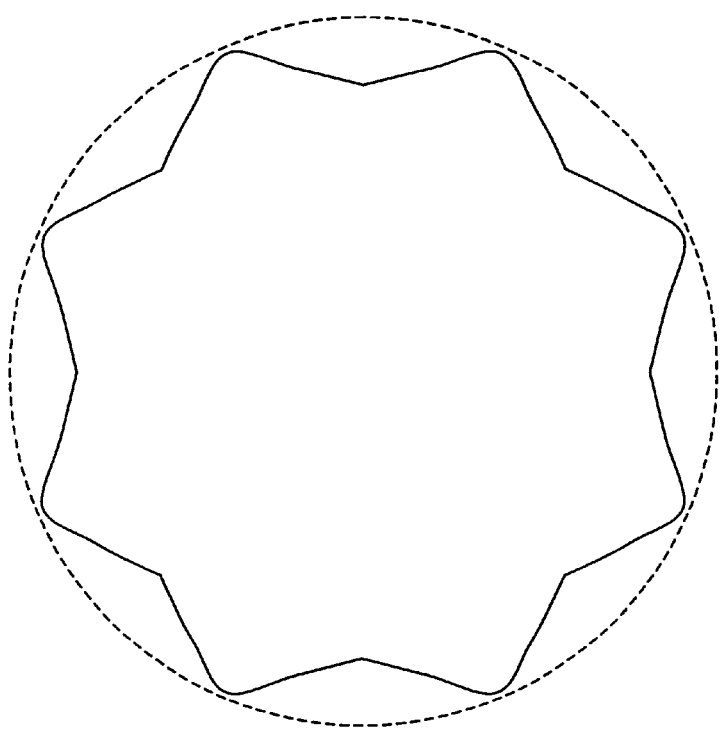
FIG. 20 is a diagram of a combined radiation pattern.

In some implementations of apparatus A100, variation of the level of the radiated signal is limited. FIG. 20 illustrates one possible radiation pattern of a combined signal as radiated by such an implementation of apparatus A100. One may see that this pattern has a lesser degree of variation as compared with a pattern as shown in FIG. 13 (the dashed circle represents the condition where varying terms are reduced to zero and may also represent the same power limit as the circle in FIG. 13).

Figure 21:
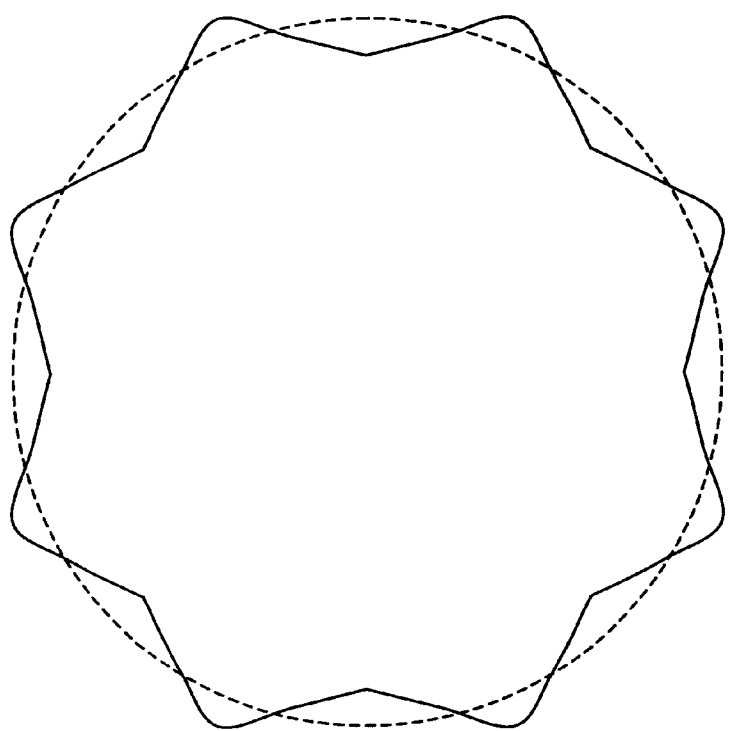
FIG. 21 is a diagram of a combined radiation pattern.

In one such implementation of apparatus A100, the magnitude of one or more gain factors varies as [k*α(t)], where k is a constant factor and α(t) is a term that varies over time. FIG. 21 shows a possible radiation pattern of a combined signal as radiated by such an implementation of apparatus A100 (the dashed circle represents the condition where varying terms are reduced to zero and may also represent the same power limit as the circle in FIG. 13). In this example, the value of k corresponds to a desired peak power variation factor (e.g. 1–4 dB), and α(t) is a (e.g. zero-mean) deterministic or nondeterministic process whose values are limited to the range [−1, +1]. In one such example, α(t) has the value cos(ωt+θ). As shown in FIG. 15 and discussed above, the variations of gain factors of nearby instances of apparatus A100 may be synchronized.

If the quality of a channel as observed by mobile unit M100 is time-varying, then the mobile unit M100 may indicate a higher channel quality relative to the average for some fraction of the time and a lower channel quality relative to the average for some other fraction of the time. It may be desirable to schedule data transmissions to mobile unit M100 during periods when the indicated channel quality is higher than average.

In some implementations, base station B100 calculates (possibly for several different instances of mobile unit M100) an average of the plurality of channel quality indications it receives from each instance of mobile unit M100. For example, calculating this average may include applying a low-pass filter to a history of received channel quality indications. Base station B100 then transmits data to those instances of mobile unit M100 that indicate a higher-than-average channel quality.

In another example, a low-pass filter is applied to a history of rates at which the particular instance has been served, with the result being compared to a current channel quality indication. In one such implementation, data transmission is biased in favor of an instance of mobile unit M100 whose channel quality indication indicates a data rate that is higher than the average data rate at which the instance has previously been served.

It may be desirable to schedule data transmissions according to channel quality indications as normalized by a data transmission history. In a particular example, a scheduler H100 schedules the next data transmission to that mobile unit I which has the highest ratio of requested data rate DRC to average served rate R:

$$DRC_I(n)/R_I(n), \text{ where } R_I(n)=(1-1/tc)*R_I(n-1)+(1/tc),$$

where $DRC_I$, is the data rate currently requested by mobile unit I, $R_I(x)$ is the average served rate of mobile unit I in slot (x), and tc is a scheduler time constant. In one embodiment, tc has the value 1000 time slots, although the time constant may be any positive integer greater than one and its particular value may depend on the application.

The scheduling of the data communication can be based on additional considerations such as the guarantee of service (GOS) of the user, the queue size, the type of data, the amount of delay already experienced, and the error rate of the data transmission. Other factors may also be considered in scheduling data transmissions (e.g. changes in load or environmental conditions), and such variations are included within the scope of the present invention.

Figure 22:
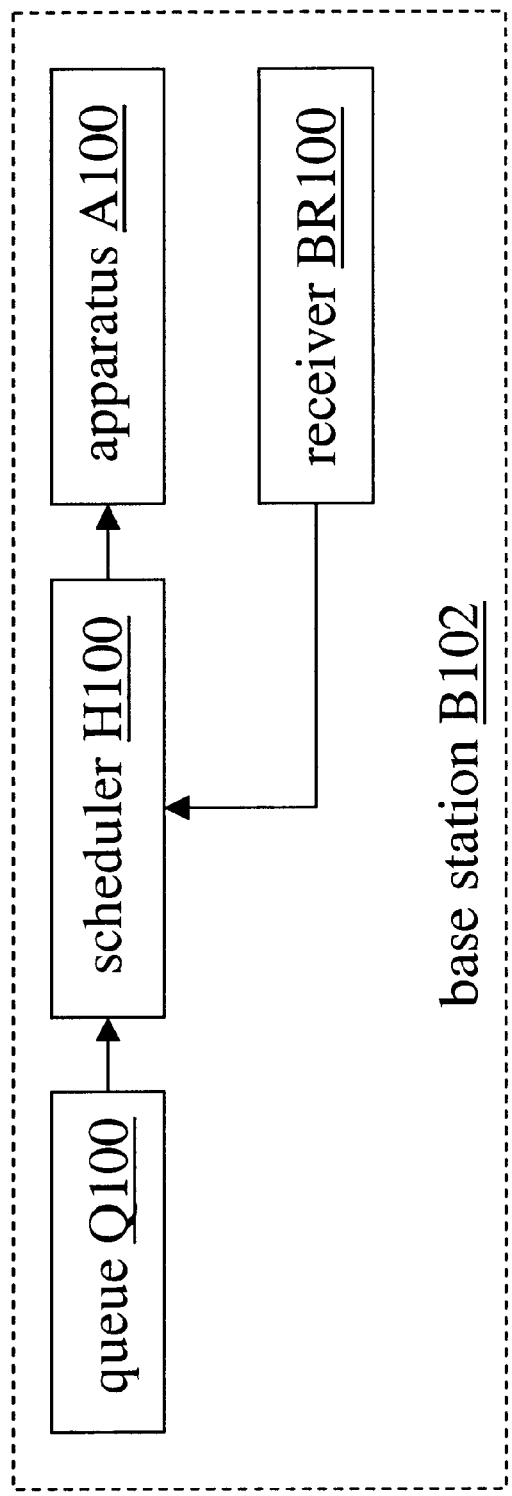
FIG. 22 is a block diagram of an implementation B102 of base station B100.

The implementation of scheduler H100 in a particular application may depend on whether centralized or distributed scheduling processing is desired. For distributed processing, for example, a separate instance of a scheduler H100 may be coupled to or even included in each instance of base station B100. FIG. 22 shows a block diagram of an implementation B102 of base station B100 in which scheduler H100 is coupled to data queue Q100 (e.g. to receive the queue size, which may indicate the amount of data available for transmission), apparatus A100, and receiver BR100 (e.g. to receive the channel quality indications). Conversely, for centralized processing, scheduler H100 may coordinate the data transmissions of multiple instances of base station B100. In some such applications, scheduler H100 may be included within controller C100.

As noted above, in some cases the variations of the gain factors are periodic. While it may be desirable for the time periods of these variations to be relatively short (e.g. to increase a rate of channel quality variation), it may also be desirable not to excessively reduce these periods. Once a receiver R100 observes a channel quality, for example, it may be desirable for the receiver to send the channel quality indication and to receive data in response before a substantial change in channel quality occurs. It may also be desirable to reduce the impact of such channel quality variations on channel tracking algorithms, control loops, and/or other operations that may be active, such that a method or apparatus according to an embodiment of the invention may be practiced at the transmitter of an existing system without modification to the receivers.

In one example, the values of the time periods of the variations of the gain factors are selected to be within a forward link scheduler time constant. In some applications, the duration of the period may be the same for all gain factors. In some applications, the time period of the magnitude and/or phase variations is also based on environmental factors that may affect channel quality (e.g. the speed of the receiver relative to the transmitter, the number and nature of reflectors and other obstructors in the vicinity, etc.).

The foregoing presentation of the described embodiments is provided to enable any person skilled in the art to make or use the present invention. Various modifications to these embodiments are possible, and the generic principles presented herein may be applied to other embodiments as well. For example, an embodiment of the the invention may be implemented in part or in whole as a hard-wired circuit, as a circuit configuration fabricated into an application-specific integrated circuit, or as a firmware program loaded into non-volatile storage or a software program loaded from or into a storage medium as machine-readable code, such code being instructions executable by an array of logic elements such as a stand-alone or embedded microprocessor, microcontroller, or other digital signal processing unit.

In a further implementation, variations of one or more gain factors may occur in response to transmissions received, e.g., from mobile unit M100. For example, a combined radiation pattern of apparatus A100 may be selected based on the direction from which data transmission is requested. Thus, the present invention is not intended to be limited to the embodiments discussed above but rather is to be accorded the widest scope consistent with the principles and novel features disclosed in any fashion herein.

We claim:

1. A transmitter comprising:
a first gain element configured and arranged to modulate a radio-frequency signal according to a first gain factor to produce a first output signal; and
a second gain element configured and arranged to modulate the radio-frequency signal according to a second gain factor to produce a second output signal,
wherein a magnitude of the first gain factor varies over time,
wherein a magnitude of the second gain factor varies over time with respect to the magnitude of the first gain factor,
wherein at least one among a magnitude and a phase of at least one among the first and second gain factors varies over time according to a periodic function,
wherein a period of the periodic function is not less than one-half second, and
wherein the period of the periodic function is not more than four seconds.

2. A transmitter comprising:
a first gain element configured and arranged to modulate a radio-frequency signal according to a first gain factor to produce a first output signal;
a second gain element configured and arranged to modulate the radio-frequency signal according to a second gain factor to produce a second output signal,
wherein a magnitude of the first gain factor varies over time, and
wherein a magnitude of the second gain factor varies over time with respect to the magnitude of the first gain factor; and
an antenna array including:
a first antenna configured and arranged to radiate a signal based on the first output signal; and
a second antenna configured and arranged to radiate a signal based on the second output signal,
wherein the first and second antennas are configured and arranged such that the radiation pattern of one antenna substantially overlaps the radiation pattern of the other antenna.

3. The transmitter according to claim 2, wherein a value of at least one among the first and second gain factors at a moment of time is based on a boresite azimuth angle of the antenna array.

4. A transmitter comprising:
a first gain element configured and arranged to modulate a radio-frequency signal according to a first gain factor to produce a first output signal;
a second gain element configured and arranged to modulate the radio-frequency signal according to a second gain factor to produce a second output signal,
wherein a magnitude of the first gain factor varies over time, and
wherein a magnitude of the second gain factor varies over time with respect to the magnitude of the first gain factor; and
at least one additional gain element, each additional gain element being configured and arranged to modulate the radio-frequency signal according to a corresponding additional gain factor to produce a corresponding additional output signal,
wherein a sum of the magnitudes of the first, second, and additional gain factors is substantially constant over time.

5. A transmitter comprising:
a first gain element configured and arranged to modulate a radio-frequency signal according to a first gain factor to produce a first output signal; and
a second gain element configured and arranged to modulate the first output signal according to a second gain factor to produce a second output signal,
wherein a magnitude of the first gain factor varies over time,
wherein a magnitude of the second gain factor varies over time with respect to the magnitude of the first gain factor,
wherein at least one among a magnitude and a phase of at least one among the first and second gain factors varies over time according to a periodic function,
wherein a period of the periodic function is not less than one-half second, and
wherein the period of the periodic function is not more than four seconds.

6. A transmitter comprising:
a first gain element configured and arranged to modulate a radio-frequency signal according to a first gain factor to produce a first output signal;
a second gain element configured and arranged to modulate the first output signal according to a second gain factor to produce a second output signal,
wherein a magnitude of the first gain factor varies over time, and wherein a magnitude of the second gain factor varies over time with respect to the magnitude of the first gain factor; and an antenna array including:
a first antenna configured and arranged to radiate a signal based on the first output signal; and
a second antenna configured and arranged to radiate a signal based on the second output signal,
wherein the first and second antennas are configured and arranged such that the radiation pattern of one antenna substantially overlaps the radiation pattern of the other antenna.

7. The transmitter according to claim 6, wherein a value of at least one among the first and second gain factors at a moment of time is based on a boresite azimuth angle of the antenna array.

8. A transmitter comprising:
a first gain element configured and arranged to modulate a radio-frequency signal according to a first gain factor to produce a first output signal;
a second gain element configured and arranged to modulate the first output signal according to a second gain factor to produce a second output signal,
wherein a magnitude of the first gain factor varies over time, and
wherein a magnitude of the second gain factor varies over time with respect to the magnitude of the first gain factor; and
at least one additional gain element, each additional gain element being configured and arranged to modulate the first output signal according to a corresponding additional gain factor to produce a corresponding additional output signal,
wherein a sum of the magnitudes of the first, second, and additional gain factors is substantially constant over time.

9. An apparatus for data transmission, said apparatus comprising:
a transmitter including an RF unit configured and arranged to output a radio-frequency signal, a first power amplifier configured and arranged to output a first amplified signal based on the radio-frequency signal, and a second power amplifier configured and arranged to output a second amplified signal based on the radio-frequency signal, and
an antenna array including a first antenna configured and arranged to receive and radiate the first amplified signal and a second antenna configured and arranged to receive and radiate the second amplified signal,
wherein a distance between the first and second antennas is a few wavelengths of a carrier signal of the radio-frequency signal, and
wherein a magnitude of the power of the first amplified signal varies over time, and
wherein a magnitude of the power of the second amplified signal varies over time with respect to the magnitude of the power of the first signal.

10. The apparatus for data transmission according to claim 9, wherein said transmitter is further configured and arranged to radiate a signal whose field intensity varies periodically over time with respect to angle in a portion of a horizontal plane centered at the antenna array.

11. The apparatus for data transmission according to claim 10, wherein a period of the variation of the field intensity is not less than one-half second and not greater than four seconds.

12. The apparatus for data transmission according to claim 9, wherein the radio-frequency signal is encoded using a CDMA scheme.

13. The apparatus for data transmission according to claim 9, said apparatus further comprising a data queue configured and arranged to store data,
wherein the RF unit is further configured and arranged to output a paging message directed to a mobile unit when the data queue stores data directed to the mobile unit.

14. The apparatus for data transmission according to claim 9, said apparatus further comprising a receiver configured and arranged to receive a channel quality indication from a mobile unit,
wherein said apparatus is further configured and arranged to transmit data directed to the mobile unit based on a value of the channel quality indication.

15. The apparatus for data transmission according to claim 14, said apparatus further comprising a scheduler configured and arranged to normalize a value of the channel quality indication by a history of data transmissions to the mobile unit.

16. The apparatus for data transmission according to claim 14, said apparatus further comprising a decoder configured and arranged to remove from the channel quality indication a predetermined code that is at least nearly orthogonal.

17. A method for data transmission comprising:
applying a first gain factor to a radio-frequency signal to produce a first output signal; and
applying a second gain factor to one among the radio-frequency signal and the first output signal to produce a second output signal,
wherein said applying a first gain factor includes varying a magnitude of the first gain factor over time,
wherein said applying a second gain factor includes varying a magnitude of the second gain factor over time with respect to the magnitude of the first gain factor,
wherein at least one among said applying a first gain factor and said applying a second gain factor includes varying at least one of a magnitude and a phase of the corresponding gain factor over time according to a periodic function,
wherein a period of the periodic function is not less than one-half second, and
wherein the period of the periodic function is not more than four seconds.

18. A method for data transmission comprising:
applying a first gain factor to a radio-frequency signal to produce a first output signal;
applying a second gain factor to one among the radio-frequency signal and the first output signal to produce a second output signal,
wherein said applying a first gain factor includes varying a magnitude of the first gain factor over time, and
wherein said applying a second gain factor includes varying a magnitude of the second gain factor over time with respect to the magnitude of the first gain factor;
radiating a signal based on the first output signal over a spatial region with a first antenna of an antenna array; and
radiating a signal based on the second output signal over substantially the spatial region with a second antenna of an antenna array.

19. The method for data transmission according to claim 18, wherein at least one among said applying a first gain factor and said applying a second gain factor includes varying a magnitude of the corresponding gain factor based on a boresite azimuth angle of the antenna array.

20. A method for data transmission comprising:
applying a first gain factor to a radio-frequency signal to produce a first output signal;
applying a second gain factor to one among the radio-frequency signal and the first output signal to produce a second output signal,
wherein said applying a first gain factor includes varying a magnitude of the first gain factor over time, and
wherein said applying a second gain factor includes varying a magnitude of the second gain factor over time with respect to the magnitude of the first gain factor;
receiving a channel quality indication from a mobile unit;
transmitting data directed to the mobile unit based on a value of the channel quality indication; and
normalizing a value of the channel quality indication by a history of data transmissions to the mobile unit.

21. A method for data transmission comprising:
applying a first gain factor to a radio-frequency signal to produce a first output signal;
applying a second gain factor to one among the radio-frequency signal and the first output signal to produce a second output signal,
wherein said applying a first gain factor includes varying a magnitude of the first gain factor over time, and
wherein said applying a second gain factor includes varying a magnitude of the second gain factor over time with respect to the magnitude of the first gain factor;
receiving a channel quality indication from a mobile unit;
transmitting data directed to the mobile unit based on a value of the channel quality indication; and
removing from the channel quality indication a predetermined code that is at least nearly orthogonal.

22. An apparatus for data transmission, said apparatus comprising:
a transmitter including an RF unit configured and arranged to output a radio-frequency signal, a first power amplifier configured and arranged to output a first amplified signal based on the radio-frequency signal, and a second power amplifier configured and arranged to output a second amplified signal based on the first amplified signal, and
an antenna array including a first antenna configured and arranged to receive and radiate the first amplified signal and a second antenna configured and arranged to receive and radiate the second amplified signal,
wherein a distance between the first and second antennas is a few wavelengths of a carrier signal of the radio-frequency signal, and
wherein a magnitude of the power of the first amplified signal varies over time, and
wherein a magnitude of the power of the second amplified signal varies over time with respect to the magnitude of the power of the first signal.

23. The apparatus for data transmission according to claim 22, wherein said transmitter is further configured and arranged to radiate a signal whose field intensity varies periodically over time with respect to angle in a horizontal plane centered at the antenna array.

24. The apparatus for data transmission according to claim 23, wherein a period of the variation of the field intensity is not less than one-half second and not greater than four seconds.

25. The apparatus for data transmission according to claim 22, wherein the radio-frequency signal is encoded using a CDMA scheme.

26. The apparatus for data transmission according to claim 22, said apparatus further comprising a data queue configured and arranged to store data, wherein the RF unit is further configured and arranged to output a paging message directed to a mobile unit when the data queue stores data directed to the mobile unit.

27. The apparatus for data transmission according to claim 22, said apparatus further comprising a receiver configured and arranged to receive a channel quality indication from a mobile unit,
wherein, based on a value of the channel quality indication, said apparatus is further configured and arranged to transmit data directed to the mobile unit.

28. The apparatus for data transmission according to claim 27, said apparatus further comprising a scheduler configured and arranged to normalize (A) a value based on the channel quality indication by (B) a value based on a history of data transmissions to the mobile unit.

29. The apparatus for data transmission according to claim 14, said apparatus further comprising a decoder configured and arranged to remove from the channel quality indication a predetermined code that is at least nearly orthogonal.

30. A method for data transmission comprising:
applying a first gain factor to a radio-frequency signal to produce a first output signal; and
applying a second gain factor to the first output signal to produce a second output signal,
wherein said applying a first gain factor includes varying a magnitude of the first gain factor over time,
wherein said applying a second gain factor includes varying a magnitude of the second gain factor over time with respect to the magnitude of the first gain factor,
wherein at least one among said applying a first gain factor and said applying a second gain factor includes varying at least one of a magnitude and a phase of the corresponding gain factor over time according to a periodic function,
wherein a period of the periodic function is not less than one-half second, and
wherein the period of the periodic function is not more than four seconds.

31. A method for data transmission comprising:
applying a first gain factor to a radio-frequency signal to produce a first output signal;
applying a second gain factor to the first output signal to produce a second output signal,
wherein said applying a first gain factor includes varying a magnitude of the first gain factor over time, and
wherein said applying a second gain factor includes varying a magnitude of the second gain factor over time with respect to the magnitude of the first gain factor;
radiating a signal based on the first output signal over a spatial region with a first antenna of an antenna array; and
radiating a signal based on the second output signal over substantially the spatial region with a second antenna of an antenna array.

32. The method for data transmission according to claim 31, wherein at least one among said applying a first gain factor and said applying a second gain factor includes varying a magnitude of the corresponding gain factor based on a boresite azimuth angle of the antenna array.

33. A method for data transmission comprising:

applying a first gain factor to a radio-frequency signal to produce a first output signal;

applying a second gain factor to the first output signal to produce a second output signal, wherein said applying a first gain factor includes varying a magnitude of the first gain factor over time, and wherein said applying a second gain factor includes varying a magnitude of the second gain factor over time with respect to the magnitude of the first gain factor;

receiving a channel quality indication from a mobile unit;

based on a value of the channel quality indication, transmitting data directed to the mobile unit; and normalizing (A) a value based on the channel quality indication by (B) a value based on a history of data transmissions to the mobile unit.

34. A method for data transmission comprising:

applying a first gain factor to a radio-frequency signal to produce a first output signal;

applying a second gain factor to the first output signal to produce a second output signal, wherein said applying a first gain factor includes varying a magnitude of the first gain factor over time, and wherein said applying a second gain factor includes varying a magnitude of the second gain factor over time with respect to the magnitude of the first gain factor;

receiving a channel quality indication from a mobile unit;

based on a value of the channel quality indication, transmitting data directed to the mobile unit; and removing from the channel quality indication a predetermined code that is at least nearly orthogonal.

* * * * *